United States Patent
Lee

(10) Patent No.: US 12,429,982 B2
(45) Date of Patent: Sep. 30, 2025

(54) TOUCH DETECTION MODULE THAT CHANGES DRIVING MODE ACCORDING TO NOISE LEVEL, OBJECT DETECTION RESULT, OR TOUCH POSITION DETECTION RESULT

(71) Applicant: SAMSUNG DISPLAY CO., LTD., Yongin-si (KR)

(72) Inventor: Soon Gyu Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/184,624

(22) Filed: Mar. 15, 2023

(65) Prior Publication Data

US 2023/0297191 A1    Sep. 21, 2023

(30) Foreign Application Priority Data

Mar. 16, 2022  (KR) ................ 10-2022-0032607

(51) Int. Cl.
*G06F 3/044*   (2006.01)
*G06F 3/041*   (2006.01)

(52) U.S. Cl.
CPC ...... *G06F 3/04186* (2019.05); *G06F 3/04166* (2019.05); *G06F 3/0446* (2019.05); *G06F 2203/04108* (2013.01)

(58) Field of Classification Search
CPC ............. G06F 3/04186; G06F 3/04166; G06F 3/0446; G06F 3/04182; G06F 2203/04108
See application file for complete search history.

(56) References Cited

U.S. PATENT DOCUMENTS

| | | | |
|---|---|---|---|
| 10,120,503 B2 | 11/2018 | Suzuki et al. | |
| 2013/0321343 A1* | 12/2013 | Miyamoto | G06F 3/0445 345/175 |
| 2015/0054754 A1* | 2/2015 | Han | G06F 3/0446 345/173 |
| 2015/0220170 A1* | 8/2015 | Nam | G06F 3/041 345/173 |
| 2016/0342265 A1* | 11/2016 | Geaghan | G06F 3/0446 |

FOREIGN PATENT DOCUMENTS

| | | |
|---|---|---|
| KR | 10-1030001 | 4/2011 |
| KR | 10-1747731 | 6/2017 |
| KR | 10-2018-0021728 | 3/2018 |
| KR | 10-2018-0104835 | 9/2018 |
| KR | 10-2019-0075755 | 7/2019 |
| KR | 10-2020-0101265 | 8/2020 |
| KR | 10-2175103 | 11/2020 |
| KR | 10-2021-0018720 | 2/2021 |
| KR | 10-2021-0037556 | 4/2021 |

* cited by examiner

*Primary Examiner* — Sanghyuk Park
(74) *Attorney, Agent, or Firm* — F. CHAU & ASSOCIATES, LLC

(57) ABSTRACT

A touch detection module includes a plurality of driving electrodes that extends in parallel; a plurality of sensing electrodes that intersect the plurality of driving electrodes; and a touch driving circuit that supplies touch driving signals to the plurality of driving electrodes and detects touch position coordinates by detecting touch sensing signals through the plurality of sensing electrodes. The touch driving circuit changes a driving mode according to at least one of a noise level, an object detection result, or a touch position detection result.

20 Claims, 20 Drawing Sheets

FIG.15

| RECOGNITION MODE | BIOMETRIC RECOGNITION FIRST MODE | BIOMETRIC RECOGNITION SECOND MODE |
|---|---|---|
| LIGHT EXPOSURE TIME | SET TIME | SET TIME+α |
| FINGERPRINT DETECTION | REFERENCE VALUE | LOWERING CRITERIA FOR DETERMINATION |
| COORDINATES CALCULATION | X | X |

TOUCH DETECTION MODULE THAT CHANGES DRIVING MODE ACCORDING TO NOISE LEVEL, OBJECT DETECTION RESULT, OR TOUCH POSITION DETECTION RESULT

CROSS-REFERENCE TO RELATED APPLICATION

This application claims priority under 35 U.S.C. 119 from Korean Patent Application No. 10-2022-0032607, filed on Mar. 16, 2022 in the Korean Intellectual Property Office, the contents of which are herein incorporated by reference in their entirety.

TECHNICAL FIELD

Embodiments of the present disclosure are directed to a touch detection module and a display device that includes the same.

DISCUSSION OF THE RELATED ART

The demand for various forms of display devices that display images is increasing. For example, display devices are being incorporated into various electronic devices, such as smartphones, digital cameras, notebook computers, navigation devices, and smart televisions.

Examples of the display devices include flat panel display devices such as a liquid crystal display (LCD) device, a field emission display (FED) device, an organic light emitting display device, etc. Among such flat display devices, a light emitting display device includes pixels in a display panel, each of which includes a self-luminous light emitting element. Accordingly, a light emitting display device can display an image without a backlight unit that provides light to the display panel.

Recently, display devices have been developed that include a touch detection module as an input interface to detect a user's touch. A touch detection module includes a touch sensing unit that includes touch electrodes and a touch driving circuit that can detect an amount of charge charged in a capacitance between the touch electrodes. The touch detection module may be integrally formed with an image display unit of the display device, or may be separately mounted on the image display unit.

SUMMARY

Embodiments of the present disclosure provide a touch detection module and a display device that includes the same that efficiently switch a touch detection mode according to a change in a usage state and use environment of the display device.

Embodiments of the present disclosure also provide a touch detection module and a display device that includes the same that increase touch detection accuracy by correcting a touch sensing signal and switch a touch detection mode to various modes according to a noise-applied state and the use of a touch function.

According to an embodiment of the disclosure, a touch detection module includes a plurality of driving electrodes that extend in parallel; a plurality of sensing electrodes that intersect the plurality of driving electrodes; and a touch driving circuit that supplies touch driving signals to the plurality of driving electrodes and detects touch position coordinates by detecting touch sensing signals from the plurality of sensing electrodes. The touch driving circuit changes a driving mode according to at least one of a noise level, an object detection result, or a touch position detection result.

In an embodiment, the touch driving circuit includes a driving signal output part that supplies the touch driving signals to the plurality of driving electrodes; a sensing circuit part that detects the touch sensing signals from the plurality of sensing electrodes; a touch driving control part that sets at least one of the plurality of driving electrodes or at least one of the plurality of sensing electrodes as a detection reference line and controls driving of the driving signal output part such that the touch driving signals are supplied to the detection reference line; and a mode setting part that changes the driving mode of the touch driving control part according to a noise level detection signal and a result of detection of touch position coordinates.

In an embodiment, the touch detection module further includes an analog-to-digital converter that sequentially converts the touch sensing signals into touch data and converts a detection reference signal detected by the detection reference line into detection reference data; a signal deviation detection part that compares the touch data with the reference data and extracts difference data values in accordance with the comparison results; a compensation data storage that outputs compensation data that corresponds to the difference data values; and a data compensation part that corrects the touch data by performing an addition or subtraction operation on the touch data and the compensation data and calculates position coordinates for the touch data in accordance with the difference data values.

In an embodiment, the touch driving control part divides the plurality of driving electrodes into groups in units of a predetermined number of driving electrodes and supplies touch driving control signals for each group to the driving signal output part, and supplies a touch driving control signal to the driving signal output part such that the touch driving signal is supplied to the detection reference line.

In an embodiment, the touch driving control part divides the plurality of driving electrodes into groups in units of a predetermined number of driving electrodes and supplies touch driving control signals for each group to the driving signal output part, supplies a touch driving control signal and touch driving control signals for other adjacent groups to the driving signal output part, and supplies touch driving control signals for a group to which the detection reference line belongs to the driving signal output part such that the touch driving control signal for the detection reference line is repeatedly supplied.

In an embodiment, the mode setting part receives a human body detection signal from at least one human body detection sensor in response to the noise level detection signal, checks whether a body part or an object has been detected, and transmits a rejection signal to the signal deviation detection part according to whether the body part or the object has been detected, and the signal deviation detection part extracts the difference data values by rejecting the touch sensing signals or the touch data in units of a predetermined number of frames in response to the rejection signal.

In an embodiment, the data compensation part compares position coordinates detected in a normal mode, in which the noise level detection signal is not received, with position coordinates detected in a state where the noise level detection signal is received and, when the position coordinate comparison result is maintained with a predetermined error range, provides to an external display driving circuit intermediate coordinates that are between the compared position coordinates.

In an embodiment, the mode setting part changes the touch driving control part to a biometric information detection mode in response to the noise level detection signal, when the input noise level detection signal is lower than a predetermined reference level, supplies a first mode detection signal to a display driving circuit of a display panel and the touch driving control part such that biometric information and an object are detected, and when the input noise level detection signal is higher than the predetermined reference level, supplies a second mode detection signal to the display driving circuit and the touch driving control part such that the biometric information and the object are detected.

In an embodiment, the touch driving control part detects the body part or the object by adjusting at least one of a detection time, a filtering strength, or sensitivity for at least one human body detection sensor to differ from other human body detection sensors in response to the first or second mode detection signal.

In an embodiment, the mode setting part receives a human body detection signal through at least one human body detection sensor in response to the noise level detection signal and checks whether a body part or an object has been detected, and transmits a low-power mode control signal to the touch driving control part such that the touch driving control part is driven in a low-power mode, according to whether the body part or the object has been detected.

In an embodiment, the mode setting part transmits a sleep mode control signal to the touch driving control part such that the touch driving control part is driven in a sleep mode, when no touch has been detected for a predetermined period of time in a state in which the low-power mode control signal has been transmitted.

In an embodiment, the mode setting part divides an image display area of a display panel in which a plurality of human body detection sensors are disposed into a plurality of division regions according to arrangement areas of the plurality of human body detection sensors, changes a touch sensing area to arrangement areas of human body detection sensors the plurality of human body detection sensors that transmit a human detection signal, and controls the touch driving control part to supply the touch driving signals only to the driving electrodes included in the changed touch sensing area.

According to an embodiment of the disclosure, a display device includes a display panel that includes a display area in which a plurality of pixels are disposed; and a touch detection module disposed on a front surface of the display panel and that detects a user's touch. The touch detection module includes a plurality of driving electrodes that extend in parallel; a plurality of sensing electrodes that intersect the plurality of driving electrodes; and a touch driving circuit that supplies touch driving signals to the plurality of driving electrodes and detects touch position coordinates by detecting touch sensing signals through the plurality of sensing electrodes. The touch driving circuit changes a driving mode according to a at least one of a noise level input from a display driving circuit, an object detection result, or a touch position detection result.

In an embodiment, the touch driving circuit includes a driving signal output part that supplies the touch driving signals to the plurality of driving electrodes; a sensing circuit part that detects the touch sensing signals through the plurality of sensing electrodes; a touch driving control part that sets at least one of the plurality of driving electrodes or at least one of the plurality of sensing electrodes as a detection reference line and controls driving of the driving signal output part such that the touch driving signals are supplied to the detection reference line; and a mode setting part that changes the driving mode of the touch driving control part according to a noise level detection signal received from the display driving circuit and a result of detection of touch position coordinates.

In an embodiment, the display device further includes an analog-to-digital converter that sequentially converts the touch sensing signals into touch data and converts a detection reference signal detected by the detection reference line into detection reference data; a signal deviation detection part that compares the touch data with the reference data and extracts difference data values in accordance with the comparison results; a compensation data storage that outputs compensation data that corresponds to the difference data values; and a data compensation part that corrects the touch data by performing an addition or subtraction operation on the touch data and the compensation data and calculates position coordinates for the touch data in accordance with the difference data values.

In an embodiment, the touch driving control part divides the plurality of driving electrodes into groups in units of a predetermined number of driving electrodes and supplies touch driving control signals for each group to the driving signal output part, and supplies a touch driving control signal to the driving signal output part such that the touch driving signal is supplied to the detection reference line.

In an embodiment, the mode setting part receives a human body detection signal from at least one human body detection sensor in response to the noise level detection signal received from the display driving circuit, checks whether a body part or an object has been detected, and transmits a rejection signal to the signal deviation detection part according to whether the body part or the object has been detected, and the signal deviation detection part extracts the difference data values by rejecting the touch sensing signals or the touch data in units of a predetermined number of frames in response to the rejection signal.

In an embodiment, the mode setting part changes the touch driving control part to a biometric information detection mode in response to the noise level detection signal, when the input noise level detection signal is lower than a predetermined reference level, supplies a first mode detection signal to the display driving circuit of the display panel and the touch driving control part such that biometric information and an object are detected, and when the input noise level detection signal is higher than the predetermined reference level, supplies a second mode detection signal to the display driving circuit and the touch driving control part such that the biometric information and the object are detected.

In an embodiment, the mode setting part divides an image display area of a display panel in which a plurality of human body detection sensors are disposed into a plurality of division regions according to arrangement areas of the plurality of human body detection sensors, changes a touch sensing area to arrangement areas of human body detection sensors of the human body detection sensors that transmit a human detection signal, and controls the touch driving control part to supply the touch driving signals only to the driving electrodes included in the changed touch sensing area.

According to an embodiment of the disclosure, a touch detection module includes a touch driving circuit that supplies touch driving signals to a plurality of driving electrodes and detects touch position coordinates by detecting touch sensing signals from a plurality of sensing electrodes. The touch driving circuit includes a driving signal output part that supplies the touch driving signals to the plurality of driving electrodes, a sensing circuit part that detects the touch sensing signals from the plurality of sensing electrodes, a touch driving control part that sets at least one of the plurality of driving electrodes or at least one of the plurality of sensing electrodes as a detection reference line and controls driving of the driving signal output part such that the touch driving signals are supplied to the detection reference line, a mode setting part that changes a driving mode of the touch driving control part according to at least one of a noise level detection signal or a result of detection of touch position coordinates, an analog-to-digital converter that sequentially converts the touch sensing signals into touch data and converts a detection reference signal detected by the detection reference line into detection reference data, a signal deviation detection part that compares the touch data with the reference data and extracts difference data values in accordance with the comparison results, a compensation data storage that outputs compensation data that corresponds to the difference data values; and a data compensation part that corrects the touch data by performing an addition or subtraction operation on the touch data and the compensation data and calculates position coordinates for the touch data in accordance with the difference data values.

According to embodiments of the present disclosure, a touch detection module and a display device that includes the same increases the touch detection accuracy of the touch detection module in response to changes in the usage state and use environment of the display device.

In addition, according to embodiments of the present disclosure, the touch detection module and the display device that includes the same efficiently reduces power consumption by switching a touch detection mode to various other modes and increases reliability by preventing the occurrence of touch detection errors and deviations.

BRIEF DESCRIPTION OF THE DRAWINGS

FIG. 15 is a table of examples of a touch detection mode of a touch driving circuit according to an embodiment.

DETAILED DESCRIPTION

Embodiments of the present disclosure will now be described more fully hereinafter with reference to the accompanying drawings, in which embodiments of the disclosure are shown. This disclosure may, however, be embodied in different forms and should not be construed as limited to the embodiments set forth herein.

It will also be understood that when a layer is referred to as being "on" another layer or substrate, it can be directly on the other layer or substrate, or intervening layers may also be present. The same reference numbers may indicate the same components throughout the specification.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described with reference to the attached drawings.

Figure 1:
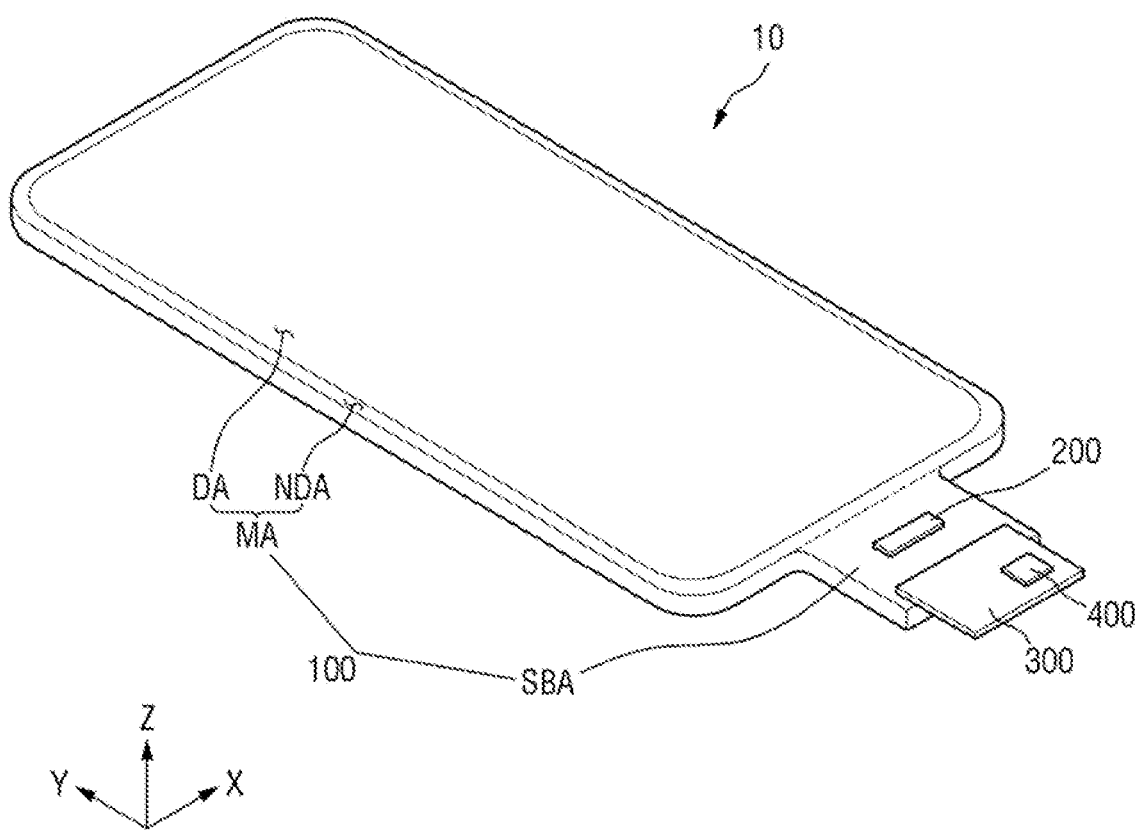
FIG. 1 is a perspective view of a display device according to an embodiment.
Figure 2:
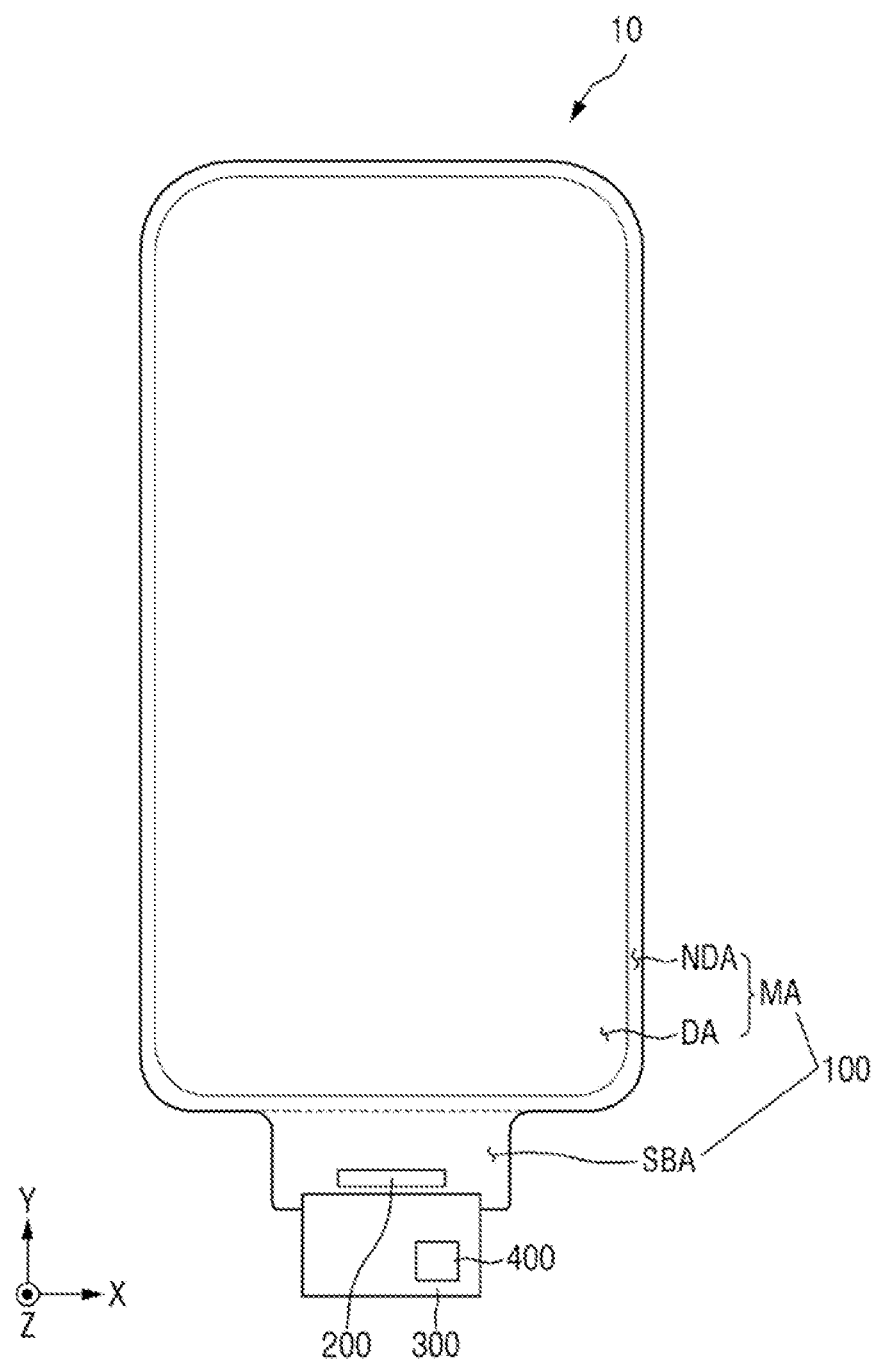
FIG. 2 is a plan view of a display device according to an embodiment.

FIG. 1 is a perspective view of a display device according to an embodiment. FIG. 2 is a plan view of a display device according to an embodiment and FIG. 3 is a side view of a display device according to an embodiment.

Figure 3:
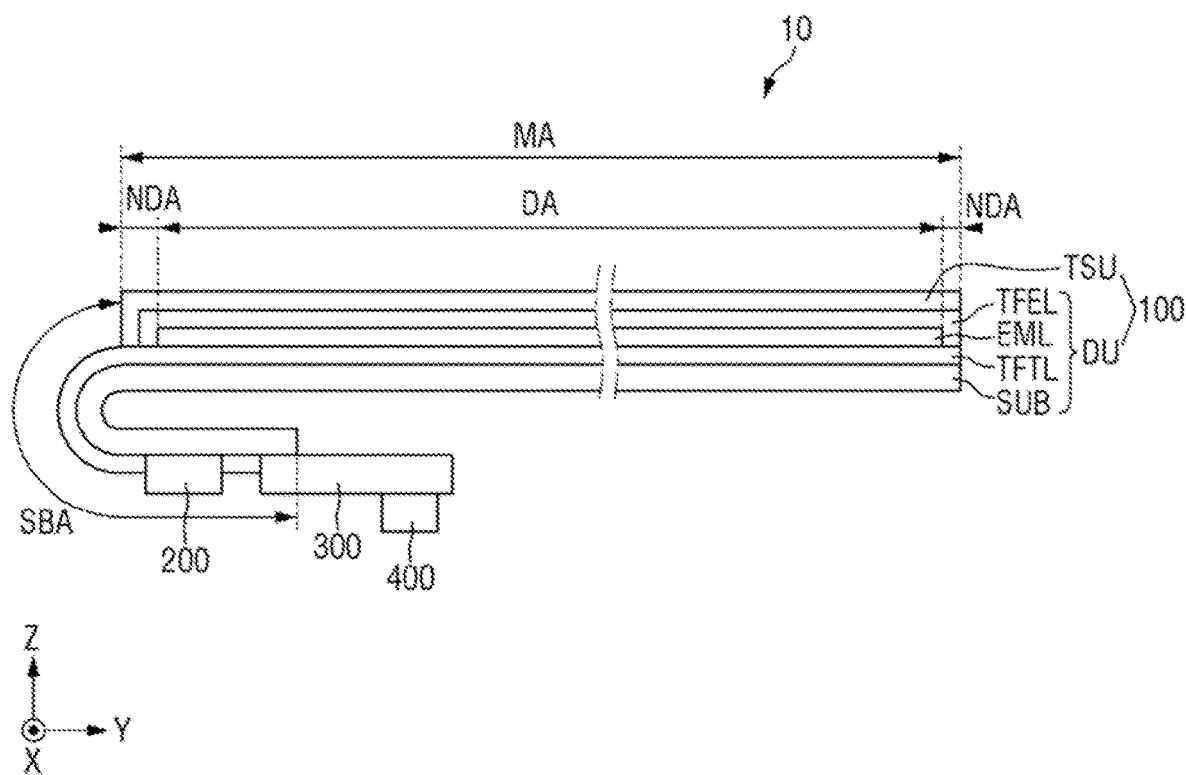
FIG. 3 is a side view of a display device according to an embodiment.

Referring to FIGS. 1 to 3, a display device 10 according to an embodiment can be incorporated into a portable electronic device, such as a mobile phone, a smartphone, a tablet personal computer, a mobile communication terminal, an electronic notebook, an electronic book, a portable multimedia player (PMP), a navigation device, an ultra-mobile PC (UMPC), etc. Alternatively, the display device 10 according to an embodiment can be used as a display part of a television, a notebook computer, a monitor, a billboard, or an Internet-of-Things (IoT) device. Alternatively, the display device 10 according to an embodiment can be incorporated into a wearable device, such as a smart watch, a watch phone, a glasses-type display, or a head-mounted display (HMD). Alternatively, the display device 10 according to an embodiment can be incorporated into a center information display (CID) in a car instrument panel, a car center fascia, or a carbon dashboard, a room mirror display that replaces car side mirrors, or an entertainment display on the back surface of the front seats that is an entertainment system for passengers in the back seats of a vehicle.

The display device 10 according to an embodiment may be one of an organic light-emitting display device that uses organic light-emitting diodes (LEDs), a quantum-dot light emitting display device that includes a quantum-dot emissive layer, an inorganic light emitting display device that includes an inorganic semiconductor, or a micro light emitting light display device that uses micro LEDs or nano LEDs. Hereinafter, a description will be given that focuses on an example in which the display device 10 according to an embodiment is an organic light emitting display device, but embodiments of the present disclosure are not necessarily limited thereto.

The display device 10 according to an embodiment includes a display panel 100, a display driving circuit 200, a display circuit board 300, and a touch driving circuit 400.

The display panel 100 has a rectangular planar shape that includes short sides in a first direction, such as an X-axis direction, and long sides in a second direction, such as a Y-axis direction, that crosses the first (X) direction. A corner where the short side in the first (X) direction meets the long side in the second (Y) direction (has a curved shape, such as a round shape, or has an angular shape, such as a right angle shape. However, the planar shape of the display panel 100 is not necessarily limited to a specific shape such as a rectangular shape, and in other embodiments, has another shape, such as a polygonal shape, a circular shape, or an elliptical shape. The display panel 100 is flat, but embodiments of the present disclosure are not necessarily limited thereto. For example, in other embodiments, the display panel 100 includes a curved portion formed at the left and right ends thereof and a constant curvature or a variable curvature. In addition, the display panel 100 may be flexible to be bent, warped, folded, or rolled.

The display panel 100 includes a main area MA and a sub-area SBA.

The main area MA includes a display area DA in which an image is displayed, and a non-display area NDA around the display area DA. In the display area DA, pixels are arranged to display an image. The sub-area SBA protrudes from one side of the main area MA in the second (Y) direction.

The sub-area SBA is illustrated as being flat in FIGS. 1 and 2, but the sub-area SBA can be bent as shown in FIG. 3. For example, the sub-area SBA is disposed on a lower surface of the display panel 100. When the sub-area SBA is bent, the sub-area SBA overlaps the main area MA in a third direction, such as a Z-axis direction, that is a thickness direction of the substrate SUB. In the sub-area SBA, the display driving circuit 200 is disposed.

In addition, as shown in FIG. 3, the display panel 100 includes a display module DU and a touch sensing unit TSU. The display module DU includes a substrate SUB, a thin film transistor layer TFTL, a light emitting element layer EML, and an encapsulation layer TFEL. The touch sensing unit TSU is disposed on the front surface of the display module DU.

The thin film transistor layer TFTL is disposed on the substrate SUB. The thin film transistor layer TFTL is disposed in the main area MA and the sub-area SBA. The thin film transistor layer TFTL includes thin film transistors.

The light emitting element layer EML is disposed on the thin film transistor layer TFTL. The light emitting element layer EML is disposed in the display area DA of the main area MA. The light emitting element layer EML includes light emitting elements disposed in light emitting parts.

The encapsulation layer TFEL is disposed on the light emitting element layer EML. The encapsulation layer TFEL is disposed in the display area DA and the non-display area NDA of the main area MA. The encapsulation layer TFEL includes at least one inorganic layer and at least one organic layer that encapsulate the light emitting element layer.

The touch sensing unit TSU is formed or mounted on the encapsulation layer TFEL. The touch sensing unit TSU is disposed on the display area DA of the main area MA. The touch sensing unit TSU can sense a touch of a person or an object by using touch electrodes.

A cover window is disposed on the touch sensing unit TSU that protects an upper portion of the display panel 100. The cover window is attached onto the touch sensing unit TSU by a transparent adhesive member such as an optically clear adhesive (OCA) film or an optically clear resin (OCR). The cover window includes an inorganic material such as glass, or an organic material such as plastic or a polymer material. To prevent a reduction in visibility of an image due to reflection of external light, a polarizing layer is additionally disposed between the touch sensing unit TSU and the cover window.

The display driving circuit 200 generates signals and voltages that drive the display panel 100. The display driving circuit 200 is an integrated circuit (IC), and is attached onto the display panel 100 by one of a chip-on-glass (COG) method, a chip-on-plastic (COP) method, or an ultrasonic bonding method, but embodiments of the present disclosure are not necessarily limited thereto. For example, in an embodiment, the display driving circuit 200 is attached onto the display circuit board 300 by a chip-on-film (COF) method.

The display circuit board 300 is attached to one end of the sub-area SBA of the display panel 100. Accordingly, the display circuit board 300 is electrically connected to the display panel 100 and the display driving circuit 200. The display panel 100 and the display driving circuit 200 receive digital video data, timing signals, and driving voltages through the display circuit board 300. The display circuit board 300 is a flexible film such as a flexible printed circuit board, a printed circuit board, or a chip-on-film.

The touch driving circuit 400 is disposed on the display circuit board 300. The touch driving circuit 400 is an IC, and is attached to the display circuit board 300.

The touch driving circuit 400 is electrically connected to the touch electrodes of the touch sensing unit TSU. The touch driving circuit 400 transmits touch driving signals to the touch electrodes of the touch sensing unit TSU and measures a change in charge of the mutual capacitance of each of a plurality of touch nodes formed by the touch electrodes. Specifically, the touch driving circuit 400 measures a voltage level of a touch sensing signal received from the touch electrodes or a change in capacitance of the plurality of touch nodes according to a change in the amount of current. In this way, the touch driving circuit 400 can determine a touch, proximity, etc., of a user according to the amount of change in charge of the mutual capacitance of each of the plurality of touch nodes. The user's touch may be direct contact of an object such as a user's finger or a pen with one surface of the cover window disposed on the touch sensing unit TSU. The proximity of the user indicates that an object, such as a user's finger or pen, is hovering over one surface of the cover window.

The touch driving circuit 400 sets at least one of the touch electrodes or a connection line thereof to be a detection reference line and additionally provides a touch driving signal to at least one detection reference line. In addition, the touch driving circuit 400 sets a touch driving signal detected by the detection reference line to be a detection reference signal. When touch sensing signals are detected through the touch electrodes, the touch driving circuit 400 compensates the voltage values of the touch sensing signals according to difference voltages between the detection reference signal and the touch sensing signals. For more accurate compensation, the touch driving circuit 400 changes at least one detection reference line to another touch electrode and the connection line thereof according to a position where a touch input is received.

The touch driving circuit 400 extracts coordinates of a touch by correcting the touch sensing signals according to a level of noise due to at one of a low-temperature driving mode, a charging mode, the application of high frequency, an electromagnetic noise-applied state, etc., or autonomously switches the driving mode. Specifically, when determining a noisy state, the touch driving circuit 400 performs correction, such as rejection of the touch sensing signals, according to whether a body part or an object is detected through human body detection sensors of the display panel 100. In addition, the touch driving circuit 400 can detect a user's touch by selectively changing a touch sensing area according to whether a body part positioned in the forward direction of the display panel 100 is detected, or can change the driving mode to a low-power mode, a standby mode, etc.

Figure 4:
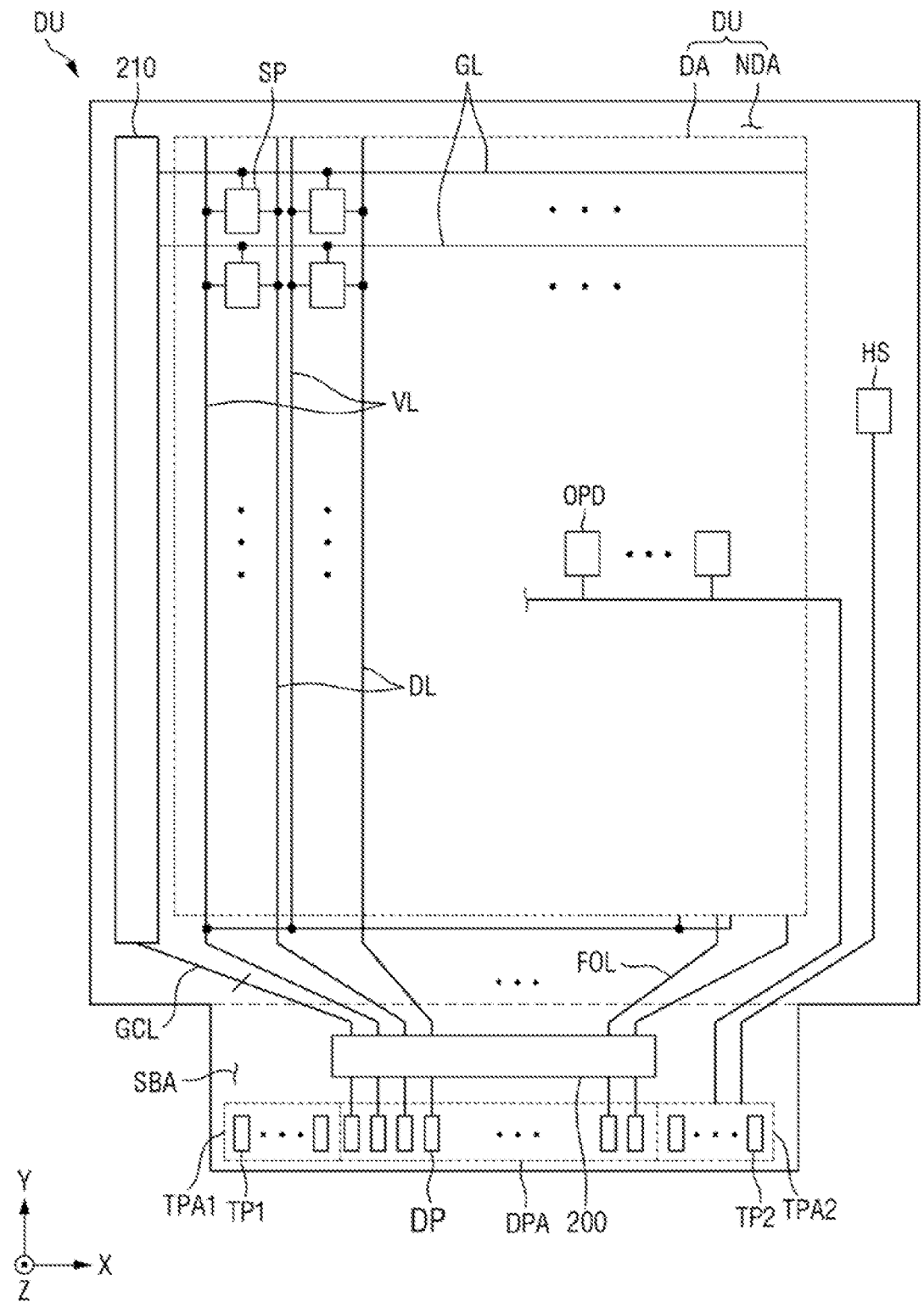
FIG. 4 is a layout view of an example of a display panel shown in FIGS. 1 to 3.

FIG. 4 is a layout view of an example of a display panel shown in FIGS. 1 to 3. Specifically, FIG. 4 shows the display area DA and the non-display area (NDA) of the display module DU before the touch sensing unit TSU is formed.

According to an embodiment, the display area DA is where an image is displayed and is a central area of the display panel 100. The display area DA includes a plurality of pixels SP, a plurality of gate lines GL, a plurality of data lines DL, and a plurality of power lines VL. Each of the plurality of pixels SP is a minimum unit that outputs light.

A plurality of human body detection sensors OPD are disposed at predetermined intervals in a plurality of preset divided regions between the pixels SP in the display area DA. The plurality of human body detection sensors OPD detect a change in the amount of light in the forward direction in response to a detection control signal from the display driving circuit 200, thereby detecting the presence or absence of an object, such as a user's body part, such as a finger, in the forward direction. The plurality of human body detection sensors OPD transmit to the display driving circuit 200 an object detection signal that corresponds to the presence or absence of an object.

A plurality of fingerprint detection sensors HS are provided in at least one of the display area DA and the non-display area NDA. The fingerprint sensors HS each include one of an optical photodiode or an optical thin film switching element and are disposed in areas between the pixels SP.

The plurality of gate lines GL provide a gate signal received from a gate driver 210 to the plurality of pixels SP. The plurality of gate lines GL extend in the X-axis direction and are spaced apart from each other in the Y-axis direction.

The plurality of data lines DL provide a data voltage received from the display driving circuit 200 to the plurality of pixels SP. The plurality of data lines DL extend in the Y-axis direction and are spaced apart from each other in the X-axis direction.

The plurality of power lines VL provide a power voltage received from the display driving circuit 200 to the plurality of pixels SP. For example, the power voltage lines include at least one of a driving voltage line, an initialization voltage line, or a reference voltage line. The plurality of power lines VL extend in the Y-axis direction and are spaced apart from each other in the X-axis direction.

The non-display area NDA surrounds the display area DA. The non-display area NDA includes a gate driver 210, fan-out lines FOL, and gate control lines GCL. The gate driver 210 generates a plurality of gate signals based on the gate control signal, and sequentially transmits the plurality of gate signals to the plurality of gate lines GL according to a set order.

The fan-out lines FOL extend from the display driving circuit 200 to the display area DA. The fan-out lines FOL supply the data voltage received from the display driving circuit 200 to the plurality of data lines DL.

The gate control lines GCL extend from the display driving circuit 200 to the gate driver 210. The gate control lines GCL provide the gate control signal received from the display driving circuit 200 to the gate driver 210.

The sub-area SBA includes the display driving circuit 200, a display pad area DPA, and first and second touch pad areas TPA1 and TPA2.

The display driving circuit 200 outputs signals and voltages that drive the display panel 100 to the fan-out lines FOL. The display driving circuit 200 supplies a data voltage through the fan-out lines FOL to the data lines DL. The data voltages are supplied to the plurality of pixels SP, and determine the luminance of the plurality of pixels SP. The display driving circuit 200 supplies a gate control signal to the gate driver 210 through the gate control lines GCL.

The display pad area DPA, the first touch pad area TPA1, and the second touch pad area TPA2 are disposed at edges of the sub area SBA. The display pad area DPA, the first touch pad area TPA1, and the second touch pad area TPA2 are electrically connected to the circuit board 300 using a low-resistance high-reliability material such as an anisotropic conductive film or SAP.

The display pad area DPA includes a plurality of display pad parts DP. The plurality of display pad parts DP are connected to a main processor through the circuit board 300. The plurality of display pad parts DP are connected to the circuit board 300 and receive digital video data from the circuit board 300, and supply digital video data to the display driving circuit 200.

Figure 5:
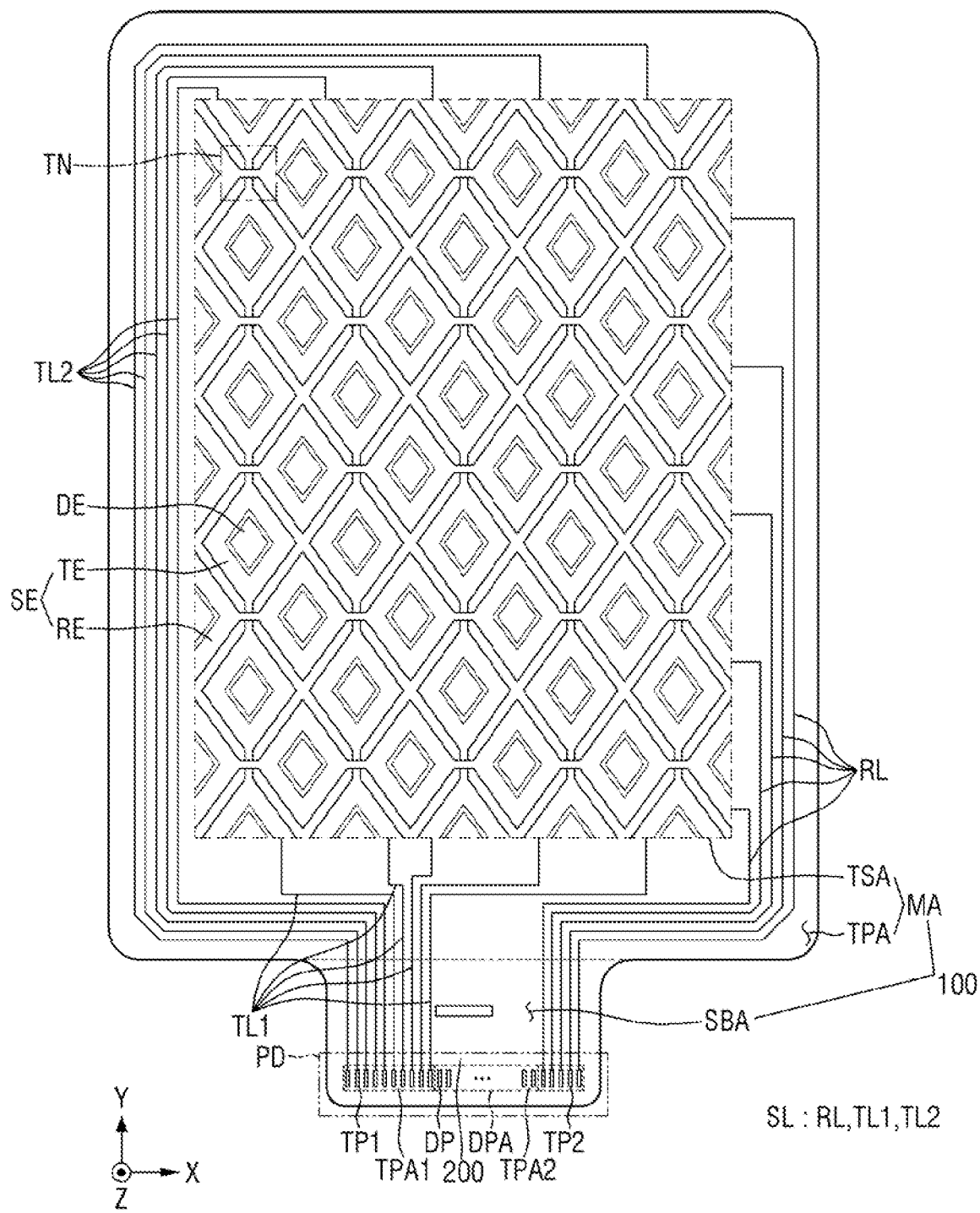
FIG. 5 is a layout view of an example of a touch detection module shown in FIG. 3.

FIG. 5 is a layout view of an example of a touch detection module shown in FIG. 3.

In FIG. 5, in an embodiment, touch electrodes SE disposed in the main area MA include two types of electrodes, such as driving electrodes TE and sensing electrodes RE, and the touch electrodes are driven by a mutual capacitance method in which after a driving signal is transmitted to the driving electrodes TE, a change in the amount of charge of the mutual capacitance of each of a plurality of touch nodes is detected through the sensing electrodes RE. However, embodiments of the present disclosure are not necessarily limited thereto.

For simplicity of illustration, FIG. 5 illustrates only the driving electrodes TE, the sensing electrodes RE, dummy patterns DE, display pad parts DP, touch lines TL1, TL2, and RL, and the first and second touch pads TP1 and TP2. The first touch pad area TPA1, and the second touch pad area TPA2 respectively include the first and second touch pads TP1 and TP2.

Referring to FIG. 5, the main area MA of the touch sensing unit TSU includes a touch sensing area TSA that senses a user's touch and a touch peripheral area TPA disposed around the touch sensing area TSA. The touch sensing area TSA overlaps the display area DA of FIGS. 1 to 3, and the touch peripheral area TPA overlap the non-display area NDA. In an embodiment, the touch sensing area TSA and the display area DA completely overlap each other, and the touch peripheral area TPA and the non-display area NDA completely overlap each other.

The driving electrodes TE, the sensing electrodes RE, and the dummy patterns DE are disposed in the touch sensing area TSA. The driving electrodes TE and the sensing electrodes RE form mutual capacitances that can sense a touch of an object or a person.

The sensing electrodes RE are arranged in parallel in the first (X) direction and the second (Y) direction. The sensing electrodes RE are electrically connected to each other in the first (X) direction. The sensing electrodes RE adjacent in the first (X) direction are connected to each other. The sensing electrodes RE adjacent in the second (Y) direction are electrically separated from each other. Accordingly, a touch node TN that has mutual capacitance is disposed at each intersection of the driving electrodes TE and the sensing electrodes RE. The plurality of touch nodes TN correspond to intersections of the driving electrodes TE and the sensing electrodes RE.

The driving electrodes TE are arranged in parallel in the first (X) direction and the second (Y) direction. The driving electrodes RE adjacent in the first (X) direction are electrically separated from each other. The driving electrodes TE are electrically connected to each other in the second (Y) direction. The driving electrodes TE adjacent in the second (Y) direction are connected to each other through separate connection electrodes.

Each of the dummy patterns DE is surrounded by a driving electrode DE or a sensing electrode RE. The dummy patterns DE are each electrically separated from the driving electrodes TE and the sensing electrodes RE. The dummy patterns DE are each disposed apart from the driving electrodes TE and the sensing electrodes RE. Each of the dummy patterns DE electrically floats.

In FIG. 5, each of the driving electrodes TE, the sensing electrodes RE, and the dummy patterns DE has a rhombus shape when viewed from the top, but embodiments of the present disclosure are not necessarily limited thereto. For example, in some embodiments, each of the driving electrodes TE, the sensing electrodes RE, and the dummy patterns DE has another shape, such as a rectangular shape other than a rhombus shape, a polygonal shape other than a rectangular shape, a circular shape, or an elliptical shape when viewed from the top.

The touch lines TL1, TL2, and RL are disposed in the sensor peripheral area TPA. The touch lines TL1, TL2, and RL include first touch driving lines TL1, second touch driving lines TL2, and touch sensing lines RL connected to the sensing electrodes RE.

Those sensing electrodes RE disposed on one side of the touch sensing area TSA are connected in one-to-one correspondence with the touch sensing lines RL. For example, as shown in FIG. 5, the sensing electrodes RE disposed on the rightmost side and that are electrically connected in the first (X) direction are connected to the touch sensing lines RL, respectively. In addition, the touch sensing lines RL are connected in one-to-one correspondence with the second touch pads TP2 disposed on the pad part PD.

Those driving electrodes TE disposed on one side of the touch sensing area TSA are connected in one-to-one correspondence with the first touch driving lines TL1, and those driving electrodes TE disposed on the other side of the touch sensing area TSA are connected in one-to-one correspondence with the second touch driving lines TL2. For example, the driving electrodes disposed on the lowermost side and that are electrically connected to each other in the second (Y) direction are connected to the first touch driving lines TL1, respectively, while the driving electrodes TE disposed on the uppermost side are connected to the second touch driving lines TL2, respectively. The second driving lines TL2 are connected to the driving electrodes TE on the upper side of the touch sensing area TSA via the left outer side of the touch sensing area TSA.

The first driving lines TL1 and the second driving lines TL2 are connected in one-to-one correspondence with the first touch pads TP1 disposed on the pad part PD. The driving electrodes TE are connected to the first and second touch driving lines TL1 and TL2 on both sides of the touch sensing area TSA and receive touch driving signals. Therefore, a difference between the touch driving signals applied to the driving electrodes TE disposed on the lower side of the touch sensing area TSA and the touch driving signals applied to the driving electrodes TE disposed on the upper side of the touch sensing area TSA due to RC delays of the touch driving signals can be prevented.

As shown in FIGS. 1 to 3, when the display circuit board 300 is connected on one side of the flexible film, the display pad area DPA of the pad part PD and the first and second touch pad areas TPA1 and TPA2 correspond to pads of the display panel 100 connected to the display circuit board 300. Accordingly, the pads of the display panel 100 are in contact with the display pads DP, the first touch pads TP1, and the second touch pads TP2. The display pads DP, the first touch pads TP1, and the second touch pads TP2 are electrically connected to the pads of the display circuit board 300 using a low-resistance high-reliability material such as an anisotropic conductive film or SAP. Therefore, the display pads DP, the first touch pads TP1, and the second touch pads TP2 are electrically connected to the touch driving circuit 400 disposed on the display circuit board 300.

Figure 6:
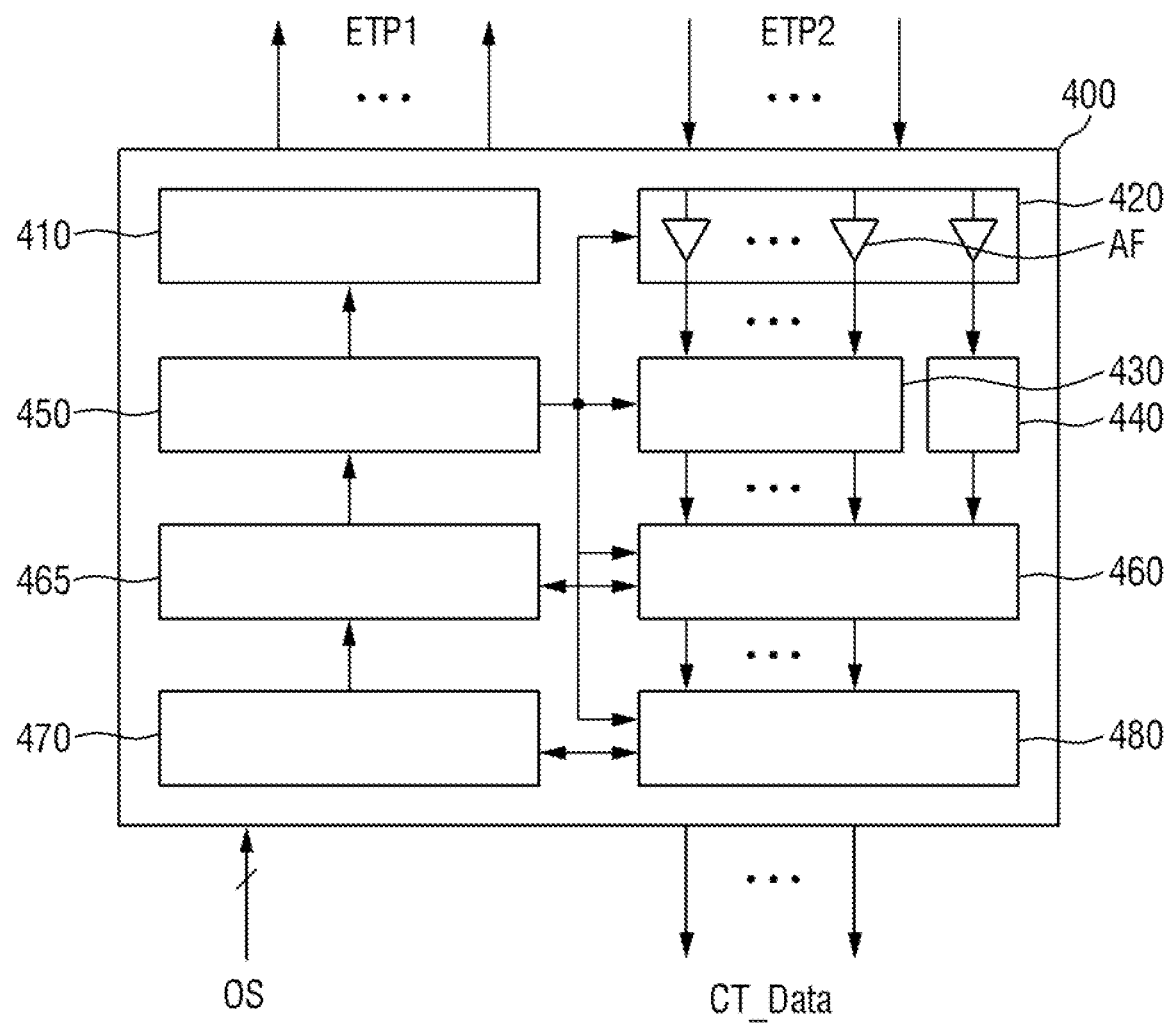
FIG. 6 is a block diagram of a touch driving circuit shown in FIGS. 1 to 3.

FIG. 6 is a block diagram of a touch driving circuit shown in FIGS. 1 to 3.

Referring to FIG. 6, in an embodiment, the touch driving circuit 400 includes a driving signal output part (an output circuit) 410, a sensing circuit part 420, an analog-to-digital converter (a converter circuit) 430, a current detection part (a detection circuit) 440, a touch driving control part (a control circuit) 450, a signal deviation detection part (a detection circuit) 460, a mode setting part (a setting circuit) 465, a compensation data storage (an output circuit) 470, and a data compensation part (a compensation circuit) 480.

The driving signal output part 410 provides touch driving signals through first touch pogo pads ETP1 to the first touch pads TP1 of the touch detection module and the driving electrodes TE. The driving signal output part 410 outputs the touch driving signals to the driving electrodes TE in response to the touch driving control signal received from the touch driving controller 450. For example, the driving signal output part 410 classifies and groups the driving electrodes TE into a predetermined number of groups in response to the touch driving control signal and sequentially outputs the touch driving signals for each group disposed on the leftmost side of the touch sensing area TSA. In addition, the touch driving signals sequentially received from the driving signal output part 410 by the driving electrodes TE disposed on the leftmost side of the touch sensing area TSA are transmitted to the driving electrodes TE disposed on the rightmost side of the touch sensing area TSA in response to the touch driving control signal. For example, the touch driving signal is provided as a plurality of pulse signals of 1.8 V.

The sensing circuit part 420 detects from the second touch pads TP2 a change in the amount of charge of a mutual capacitance of each touch node TN received from the touch sensing lines RL of the touch sensing unit TSU and through second touch pogo pads ETP2. The sensing circuit part 420 includes operational amplifiers AF that detect a change in the amount of charge of the mutual capacitance of each touch node TN. The operational amplifiers AF are connected in one-to-one correspondence with the second touch pogo pads ETP2.

Output voltages of the second touch pogo pads ETP2 are amplified by the operational amplifiers AF of the sensing circuit part 420. The analog-to-digital converter 430 sequentially converts the amplified output voltages of the second touch pogo pads ETP2, that is, output voltages according to the change in the amount of charge of each touch node TN, into touch data, which is digital data.

The current detection part 440 detects the amount of current from a test signal amplified through the operational amplifier AF of the sensing circuit part 420. The current detection part 440 detects the amount of current using a current detector, and shares a detected value of the amount of current with the signal deviation detection part 460.

The touch driving control part 450 controls the driving timing of the driving signal output part 410, the sensing circuit part 420, the analog-to-digital converter 430, and the data compensation part 480. For example, the touch driving control part 450 sequentially supplies the touch driving control signal for each group of the driving electrodes TE to the driving signal output part 410 on a predetermined period basis to control the driving signal output part 410 to supply the touch driving signals sequentially to the driving electrodes TE for each of the predetermined number of groups.

The touch driving control part 450 sets at least one of the plurality of driving electrodes TE and a connection line thereof, or one sensing electrode electrically connected thereto, as a detection reference line. In addition, the touch driving control part 450 additionally supplies a touch driving control signal for at least one detection reference line to the driving signal output part 410 so that the touch driving signal is additionally supplied to the at least one detection reference line. Accordingly, the driving signal output part 410 sequentially supplies the touch driving signals to the driving electrodes TE for each of the predetermined number of groups under the control of the touch driving control part 450, and additionally supplies a touch driving signal to at least one detection reference line when a touch driving control signal for the at least one detection reference line is received. The touch driving control part 450 changes at least one detection reference line to another driving electrode TE and a connection line thereof, or one sensing electrode electrically connected thereto, according to a position where an input touch is detected.

The signal deviation detection part 460 sequentially receives touch data associated with the touch sensing signals detected by the touch electrodes TE and the sensing electrodes RE. In addition, the signal deviation detection part 460 receives detection reference data associated with the detection reference signal detected through at least one detection reference line from the analog-to-digital converter 430 and stores the detection reference data. The signal deviation detection part 460 sequentially compares the touch data associated with the touch sensing signals with the detection reference data. The signal deviation detection part 460 extracts a result of comparing each touch data with the detection reference data, i.e., a difference data value, and transmits the difference data value to the compensation data storage 470, the mode setting part 465, the data compensation part 480, etc.

When the difference data value detected by the signal deviation detection part 460 is shared with the compensation data storage 470, the compensation data storage 470 outputs compensation data that corresponds to the difference data value to the data compensation part 480.

The data compensation part 480 stores touch data, which is digital data sequentially converted by the analog-to-digital converter 430, and corrects the touch data by performing an addition or subtraction operation between the stored touch data and the compensation data. In addition, the data compensation part 480 calculates position coordinates CT_Data for touch data that have a large difference data value, and supplies the calculated position coordinates CT_Data to the display driving circuit 200.

The mode setting part 465 receives the difference data values of the detection reference data and the touch data and checks whether a touch is detected on the touch sensing unit TSU according to the size of the difference data value. The mode setting part 465 transmits arrangement order or position information of the touch nodes having a large difference data value, such as the driving electrodes TE and the sensing electrodes RE, to the touch driving control part 450 and the driving signal output part 410. Accordingly, the touch driving control part 450 supplies the touch driving control signal to the driving signal output part 410 so that the voltage level of the touch driving signal according to the difference data value is compensated and output.

The mode setting part 465 receives a noise level detection signal from the display driving circuit 200 and checks the noise level of the display module DU and the touch sensing unit TSU. The noise level detection signal is received from the display driving circuit 200 at different levels in response to one or more of a low-temperature driving, a charging mode, the application of high-frequency, an electromagnetic noise-applied state, etc. When the noise level detection signal is received, the mode setting part 465 controls the touch driving control part 450 by changing the driving mode.

When the noise level detection signal is received, the mode setting part 465 receives a human body detection signal OS from at least one human body detection sensor OPD and the display driving circuit 200, and checks whether a body part or an object has been detected. Accordingly, the mode setting part 465 transmits a rejection signal to the signal deviation detection part 460 according to whether a body part or an object has been detected, thereby controlling rejection correction such that some of the touch sensing signals or touch data are rejected.

In addition, the mode setting part 465 changes and sets the touch sensing area according to whether a body part or an object has been detected by at least one human body detection sensor OPD, and provides location information of the touch sensing area to the touch driving control part 450. Accordingly, the touch driving control part 450 controls the touch driving signal to be supplied only to those driving electrodes TE n the touch sensing area according to the location information of the touch sensing area received from the mode setting part 465. In addition, the mode setting part 465 changes the driving mode of the touch driving control part 450 so that the touch driving control part 450 is driven in a low-power mode or a standby mode according to the level of noise in the touch sensing unit TSU or whether the touch sensing unit TSU detects a touch.

Hereinafter, the control and driving technology characteristics of the driving signal output part 410, the touch driving control part 450, the signal deviation detection part 460, and the mode setting part 465 of the touch driving circuit 400 will be described in further detail with reference to the accompanying drawings.

Figure 7:
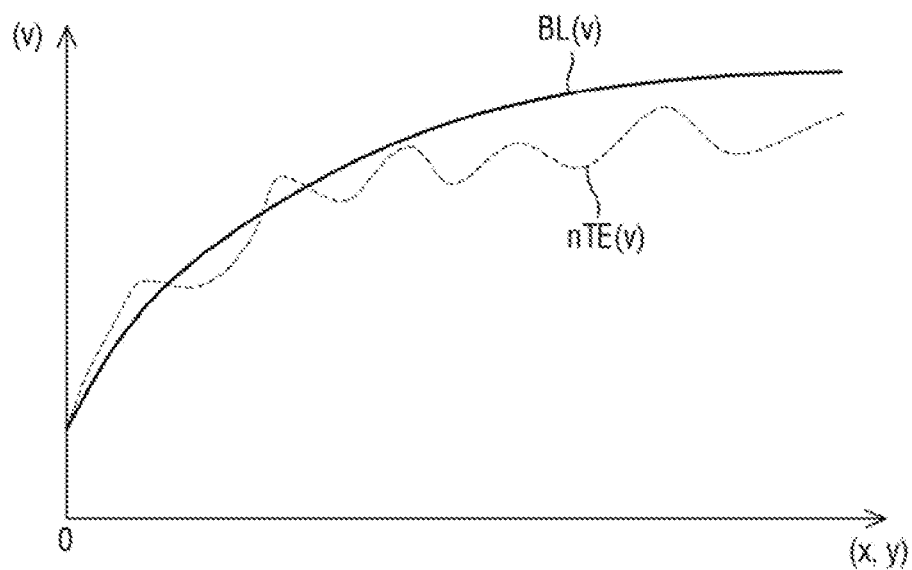
FIG. 7 is a graph of a touch sensing signal detected from the touch driving circuit of FIG. 6 and a reference detection signal.
Figure 8:
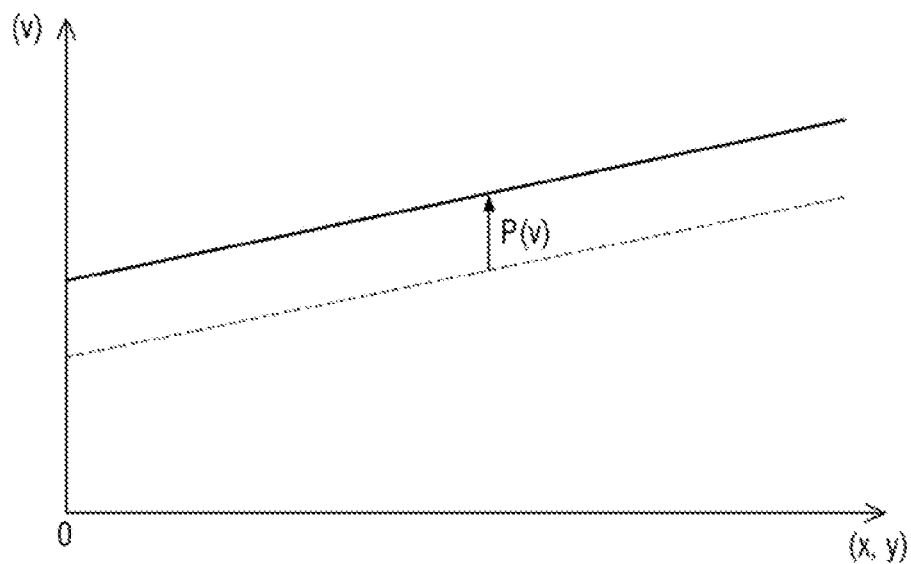
FIG. 8 is a graph that illustrates a method of correcting the magnitude of a touch sensing signal of the touch driving circuit.

FIG. 7 is a graph of a touch sensing signal detected by the touch driving circuit of FIG. 6 and a reference detection signal. FIG. 8 is a graph that illustrates a method of correcting the magnitude of a touch sensing signal of the touch driving circuit.

Referring to FIGS. 7 and 8, in an embodiment, the sensing circuit part 420 detects a change in the amount of charge of a mutual capacitance of each touch node TN from the touch sensing lines RL of the touch detection module and the second touch pads TP2 through the second touch pogo pads ETP2. For example, the analog-to-digital converter 430 sequentially converts the output voltages according to the change in the amount of charge of each touch node TN into touch data, which is digital data.

As shown in FIG. 7, the signal deviation detection part 460 receives the touch data associated with the touch sensing signals detected by the touch electrodes TE and the sensing electrode RE. In addition, the signal deviation detection part 460 also receives the detection reference signal detected by at least one detection reference line. Accordingly, the signal deviation detection part 460 sequentially compares the touch data associated with the touch sensing signals with the detection reference data to calculate comparison results of each touch data with the detection reference data, i.e., difference data values.

The difference data value of the touch data compared with the detection reference data includes a difference voltage value P(v) of a voltage BL(v) of the touch sensing signal compared with a voltage nTE(v) of the detection reference signal.

Referring to FIG. 8, the compensation data storage 470 outputs to the data compensation part 480 compensation data that correspond to the difference data values of the touch data compared with the detection reference data. Accordingly, the data compensation part 480 corrects the touch data by performing an addition or subtraction operation on the touch data that was sequentially digitized through the analog-to-digital converter 430 and the compensation data. In this way, the data compensation part 480 compensates for the difference voltage value P(v) of the voltage of the touch sensing signal compared with the voltage nTe(v) of the detection reference signal.

Figure 9:
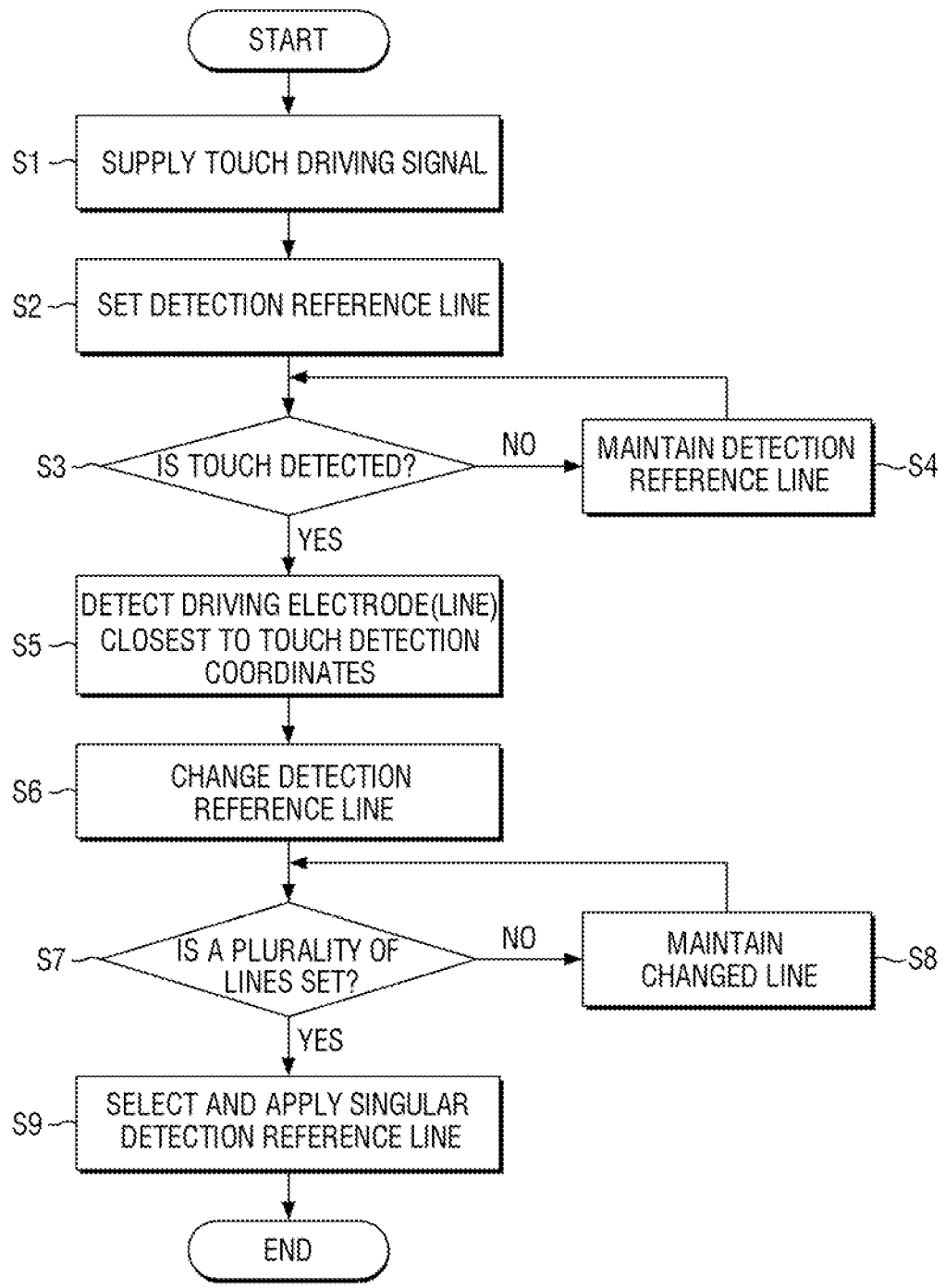
FIG. 9 is a flowchart of a process of changing a detection reference line of a touch driving circuit according to an embodiment.
Figure 10:
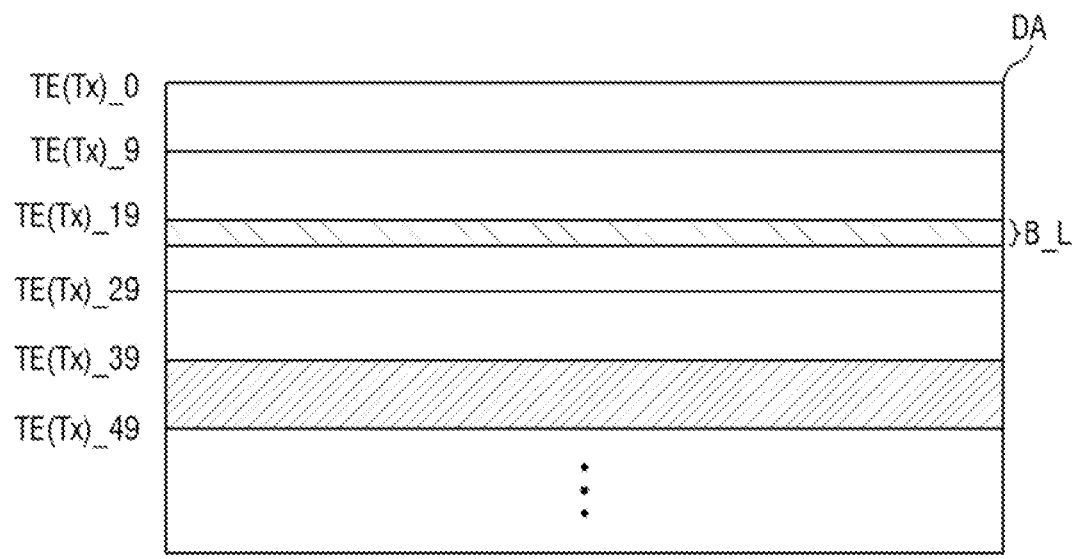
FIG. 10 illustrates a touch driving signal and detection reference signal supply sequence of a touch driving circuit according to an embodiment.

FIG. 9 is a flowchart of a process of changing a detection reference line of a touch driving circuit according to an embodiment. FIG. 10 illustrates a touch driving signal and detection reference signal supply sequence of a touch driving circuit according to an embodiment.

Referring to FIGS. 9 and 10, in an embodiment, the touch driving control part 450 sequentially supplies touch driving control signals for each group of the driving electrodes TE to the driving signal output part 410. Accordingly, the driving signal output part 410 sequentially supplies the touch driving signals to all the driving electrodes TE for each of the predetermined number of groups (S1).

For example, the touch driving control part 450 sets each group in units of a plurality of driving electrodes TE, and each of the groups is set in units of ten driving electrodes TE. Accordingly, the touch driving control part 450 sequentially supplies sets of ten touch driving control signals TE(Tx)_0 to TE(Tx)_9, TE(Tx)_10 to TE(Tx)_19, TE(Tx)_20 to TE(Tx)_29, TE(Tx)_30 to TE(Tx)_39, etc., for each group to the driving signal output part 410. The driving signal output part 410 sequentially supplies the touch driving signals to the driving electrodes TE for each group in response to the sets of ten touch driving control signals TE(Tx)_0 to TE(Tx)_9, TE(Tx)_10 to TE(Tx)_19, TE(Tx)_20 to TE(Tx)_29, TE(Tx)_30 to TE(Tx)_39, etc., for each group.

The touch driving control part 450 sets at least one of the plurality of driving electrodes TE or one of the sensing electrodes RE as a detection reference line B_L. The touch driving control part 450 additionally supplies touch driving control signals, such as TE(Tx)_19 and TE(Tx)_20, for the at least one detection reference line B_L to the driving signal output part 410 so that a touch driving signal is additionally supplied to the at least one detection reference line B_L. When the touch driving control signals, such as TE(Tx)_19 and TE(Tx)_20, for the at least one detection reference line B_L are additionally output to the driving signal output part 410, the driving signal output part 410 additionally supplies a touch driving signal to the at least one detection reference line (S2).

Figure 11:
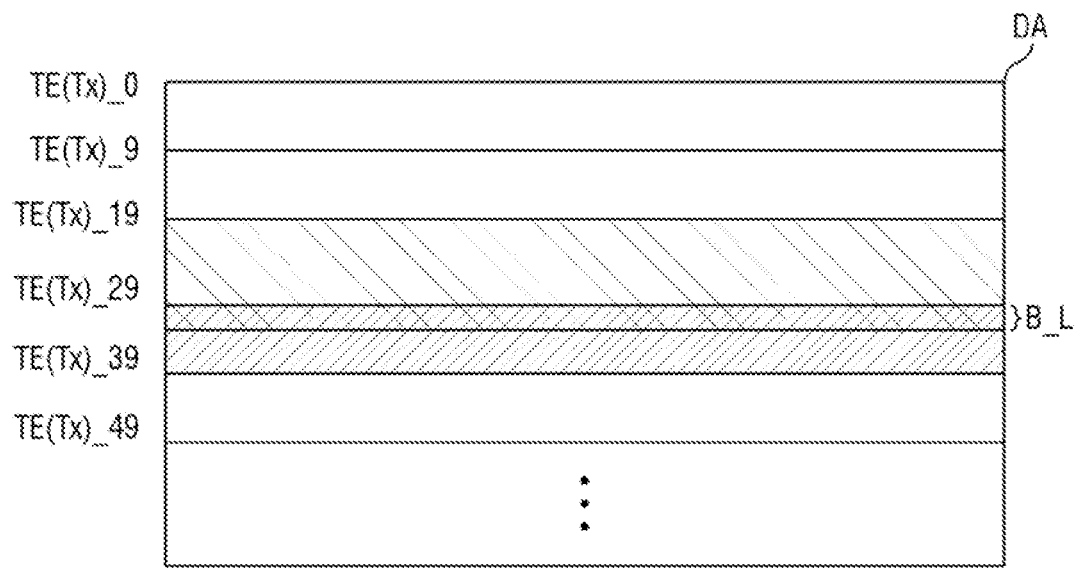
FIG. 11 illustrates a touch driving signal and detection reference signal supply sequence of a touch driving circuit according to another embodiment.

FIG. 11 illustrates a touch driving signal and detection reference signal supply sequence of a touch driving circuit according to an embodiment.

Referring to FIG. 11, in an embodiment, the touch driving control part 450 sets at least one of the plurality of driving electrodes TE or one of the sensing electrodes RE as a detection reference line B_L. Then, the touch driving control part 450 sequentially supplies sets of touch driving control signals E(Tx)_0 to TE(Tx)_9, TE(Tx)_10 to TE(Tx)_19, TE(Tx)_20 to TE(Tx)_29, TE(Tx)_30 to TE(Tx)_39, etc., for each group to the driving signal output part 410.

For example, the touch driving control part 450 supplies touch driving control signals, such as TE(Tx)_30 and TE(Tx)_31, for the at least one detection reference line B_L, together with the touch driving control signals, such as, TE(Tx)_19 to TE(Tx)_29, of the adjacent group, to the driving signal output part 410. The touch driving control part 450 supplies to the driving signal output part 410 touch driving control signals, such as TE(Tx)_30 to TE(Tx)_39, of a group to which the at least one detection reference line B_L belongs. Accordingly, the touch driving control signals, such as TE(Tx)_30 and TE(Tx)_31, for the detection reference line B_L are continuously and repeatedly generated and supplied.

The touch driving control part 450 checks whether a user's touch has been detected according to whether a difference data value is detected by the signal deviation detection part 460 (S3). When the difference data value is not detected, it is determined that the user's touch has not been made, and the preset detection reference line is maintained (S4).

Figure 12:
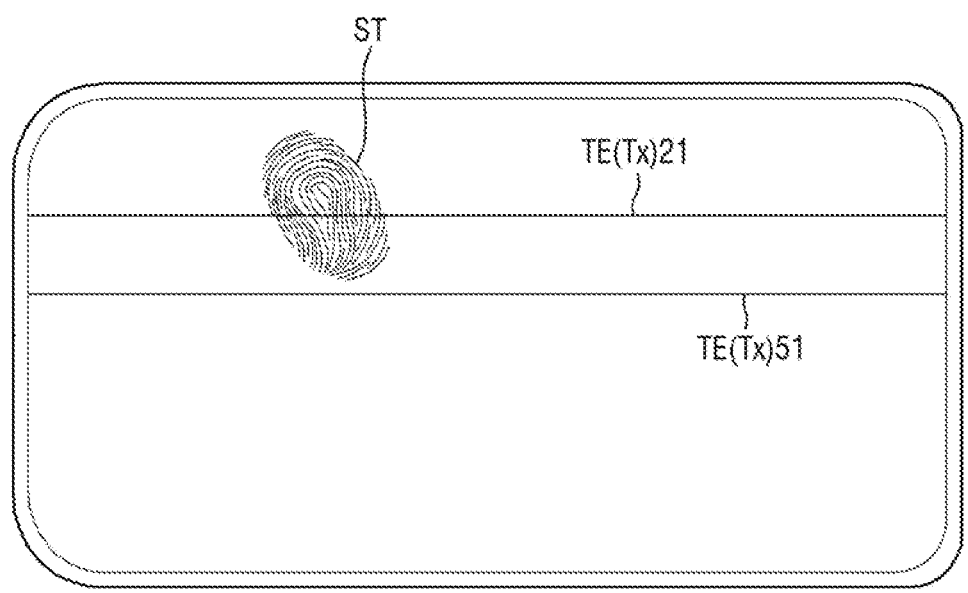
FIG. 12 illustrates a method of changing a detection reference line of a touch driving circuit according to an embodiment.
Figure 12:
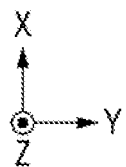

FIG. 12 illustrates a method of changing a detection reference line of a touch driving circuit according to an embodiment.

Referring to FIG. 12, inn an embodiment, when it is determined that a user's touch has been made according to whether the signal deviation detection part 460 detects the difference data value, the touch driving control part 450 receives the calculated position coordinates CT_Data from the data compensation part 480 and detects at least one driving electrode TE and at least one sensing electrode RE that correspond to the coordinates of the position of the touch (S5 in FIG. 9).

The touch driving control part 450 changes the detection reference line to at least one driving electrode, such as TE51, and a connection line thereof, or one sensing electrode electrically connected thereto (S6), where the at least one driving electrode, such as TE51, is spaced apart by a predetermined number of driving electrodes from at least one driving electrode, such as TE21, that corresponds to the coordinates of the position of the touch.

When the detection reference line changes, a plurality of detection reference lines may be set according to a plurality of driving electrodes TE that correspond to the coordinates of the position of the touch (S7). If the detection reference line changes to one detection reference line, the changed detection reference line is maintained and applied (S8). In contrast, if a plurality of detection reference lines have been set, one driving electrode (e.g., TE51) of the plurality of set detection reference lines that is disposed farthest from the position coordinates CT_Data of the touch and the connection line of the driving electrode, or one sensing electrode electrically connected to the driving electrode, are set as the detection reference line (S9).

Figure 13:
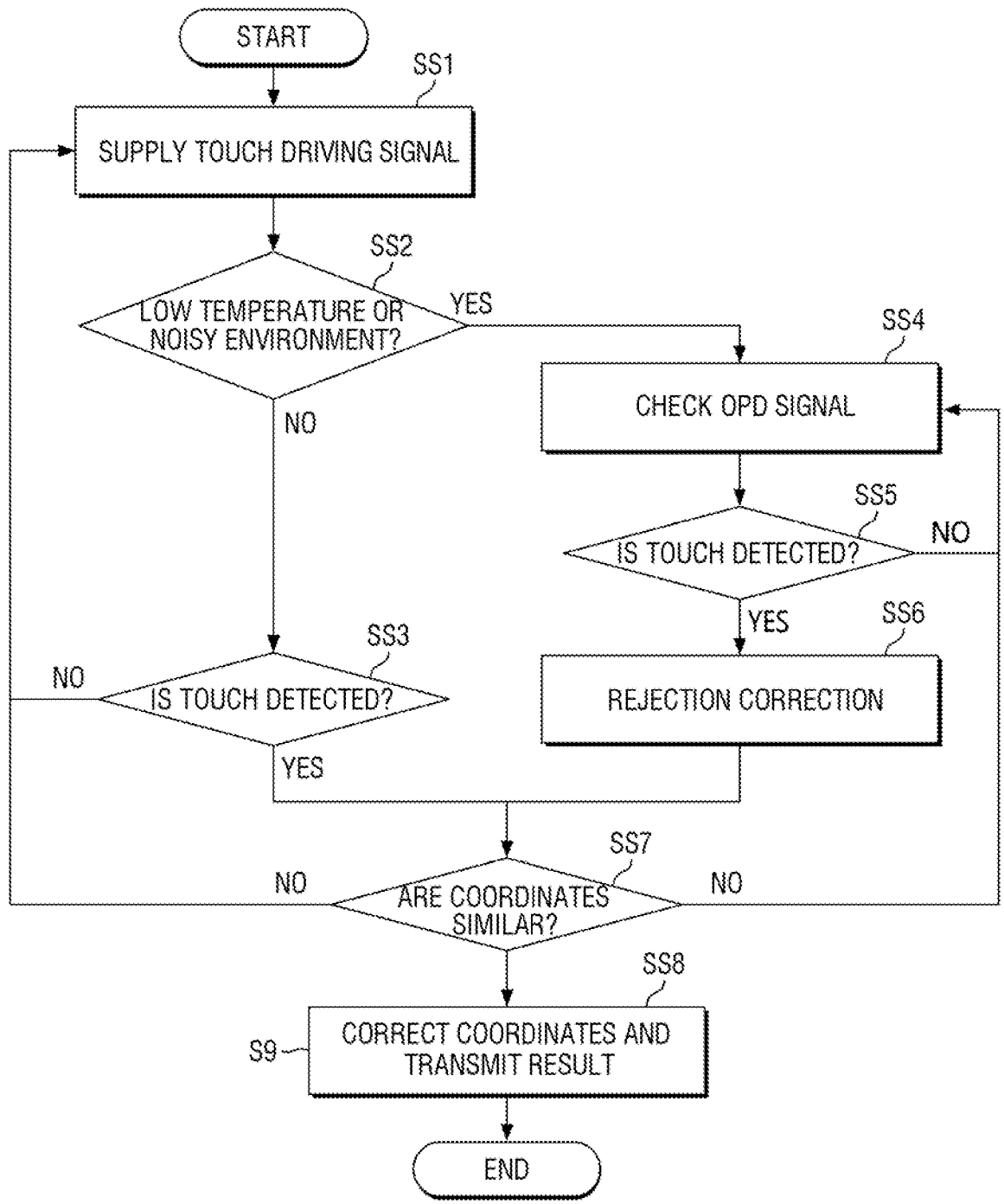
FIG. 13 is a flowchart of a process of correcting touch position coordinates of a touch driving circuit according to an embodiment.

FIG. 13 is a flowchart of a process of correcting touch position coordinates CT_Data of a touch driving circuit according to an embodiment.

Referring to FIG. 13, in an embodiment, the touch driving control part 450 sequentially supplies the touch driving control signals for each group of driving electrodes TE to the driving signal output part 410. Accordingly, the driving signal output part 410 sequentially supplies the touch driving signals to all of the driving electrodes TE for each of the predetermined number of groups (SS1).

The mode setting part 465 receives the noise level detection signal from the display driving circuit 200 and checks the noise level of the display module DU and the touch sensing unit TSU (SS2). For example, the noise level detection signal is input to the mode setting part 465 according to a repeated generation of touch sensing signals due to low-temperature driving, the application of high frequency due to a charging operation, application of another electromagnetic noise to the driving of the display panel 100, etc.

During normal driving in which the noise level detection signal is not received, the mode setting part 465 supplies a normal mode control signal to the touch driving control part 450 so that the touch driving control part 450 is driven in the normal mode, thereby enabling the touch detection (SS3). Accordingly, the data compensation part 480 calculates position coordinates CT_Data for touch data that have a large difference data value.

When the noise level detection signal is received, the mode setting part 465 receives a human body detection signal OS from at least one human body detection sensor OPD and checks whether a body part or an object has been detected (SS4).

When a touch input is detected in a noisy state (SS5), the mode setting part 465 transmits a sequentially detected rejection signal to the signal deviation detection part 460 to control the rejection correction of the signal deviation detection part 460 so that the touch sensing signal or touch data is rejected (SS6). Accordingly, when the rejection signal is received from the mode setting part 465, the signal deviation detection part 460 uses some of the touch data as valid data according to a predetermined number of frames of the sequentially detected touch data and rejects the remaining touch data. Therefore, the data compensation part 480 calculates position coordinates CT_Data only for the valid touch data.

The data compensation part 480 compares the position coordinates detected in the normal mode in which the noise level detection signal is not received with the position coordinates CT_Data detected in the noisy state (SS7). When the result of comparison between the position coordinates CT_Data is maintained within a predetermined error range, the data compensation part 480 provides to the display driving circuit 200 (SS8) intermediate coordinates that are between the compared position coordinates CT_Data.

Figure 14:
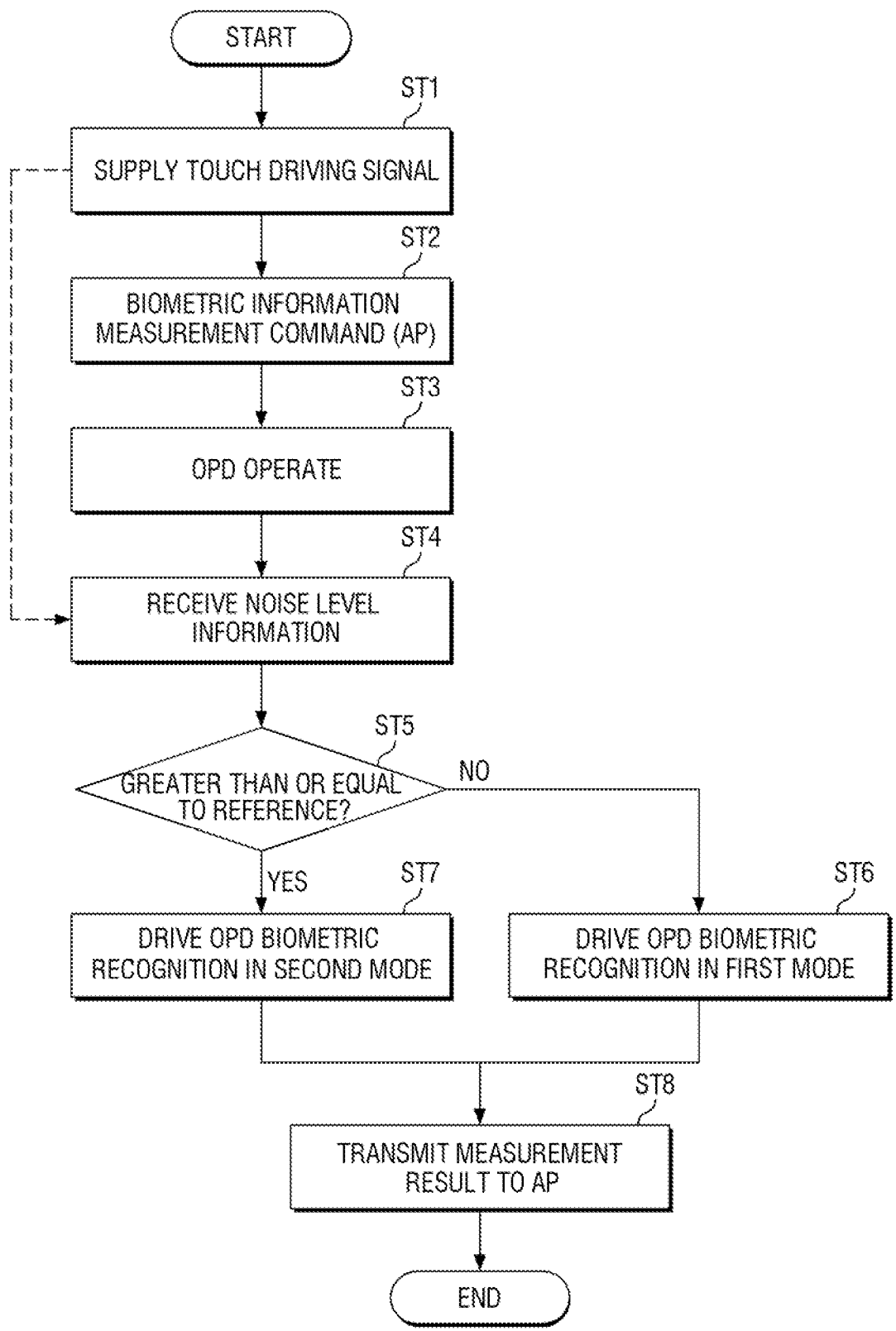
FIG. 14 is a flowchart of a process of changing a touch detection mode of a touch driving circuit according to an embodiment.

FIG. 14 is a flowchart of a process of changing a touch detection mode of a touch driving circuit according to an embodiment.

Referring to FIG. 14, in an embodiment, the touch driving control part 450 sequentially supplies touch driving control signals for each group of the driving electrodes TE to the driving signal output part 410. Accordingly, the driving signal output part 410 sequentially supplies touch driving signals to all the driving electrodes TE for each of the predetermined number of groups (ST1).

The mode setting part 465 supplies a biometric information detection mode conversion signal for detecting fingerprint information, etc., to the touch driving control part 450 in response to the noise level detection signal. In a biometric information detection mode that detects fingerprint information, etc., the display driving circuit 200 detects fingerprint information through a plurality of fingerprint detection sensors HS. The mode setting part 465 transmits the biometric information detection mode conversion signal to the touch driving control part 450 when the touch detection mode is switched to the biometric information detection mode. Accordingly, the touch driving control part 450 stops the driving signal output part 410 from outputting the touch driving signal (ST2).

In the biometric information detection mode, the mode setting part 465 receives the human body detection signal OS from at least one human body detection sensor OPD and checks whether a body part or an object has been detected (ST3).

The mode setting part 465 receives the noise level detection signal from the display driving circuit 200 and checks the noise level of the display module DU and the touch sensing unit TSU (ST4).

When the input noise level detection signal is lower than a predetermined reference level, the mode setting part 465 supplies a first mode detection signal to the display driving circuit 200 and the touch driving control part 450, so that biometric information, such as fingerprint information, and an object, can be detected by at least one human body detection sensor OPD. In contrast, when the input noise level detection signal is higher than the predetermined reference level, the mode setting part 465 supplies a second mode detection signal to the display driving circuit 200 and the touch driving control part 450, so that biometric information, such as fingerprint information, and an object, can be detected by a plurality of fingerprint detection sensors HS (ST5).

FIG. 15 is a table of examples of changing a touch detection mode of a touch driving circuit according to an embodiment. A top row of the table of FIG. 15 lists the recognition modes, the second row lists the OPD light exposure times, the third row indicates fingerprint detection modes, and the bottom row indicates whether coordinates are calculated. In the table, an "X" indicates that a particular detection or calculation was not performed.

Referring to FIG. 15, in an embodiment, the touch driving control part 450 detects a body part or an object from at least one human body detection sensor OPD in response to the first or second mode detection signal received from the mode setting part 465. For example, the touch driving control part 450 detects the body part or the object by adjusting the detection time, light exposure time, sensitivity, etc., for the at least one human body detection sensor OPD in response to the first or second mode detection signal (ST6 or ST7). For example, the touch driving control part 450 can detect a body with a human sensor during a preset detection time, that is, a set time, according to the first mode detection signal. The display driving circuit 200 sets the sensitivity of the fingerprint detection sensor HS to a preset reference value according to the first mode detection signal and detects fingerprint information.

In addition, the display driving circuit 200 detects biometric information, such as fingerprints, from the plurality of fingerprint detection sensors HS in response to the first or second mode detection signal received from the mode setting part 465. For example, the display driving circuit 200 detects the biometric information, such as fingerprint information, by adjusting the detection time, light exposure time, sensitivity, etc., for the plurality of fingerprint detection sensors HS to differ from each other, in response to the first or second mode detection signal (ST6 or ST7). The display driving circuit 200 can detect the body with the body sensor for a time obtained by adding an additional time (+α) to the detection time according to the second mode detection signal. The display driving circuit 200 can detect fingerprint information by lowering the sensitivity of the fingerprint detection sensor HS to a preset criterion according to the second mode detection signal. For example, the light exposure time may be set to a preset time, a time increased for an additional time than the set time, or a time decreased for a decreased time from the set time. The fingerprint detection sensitivity may be set as a reference value or may be set lower than the reference value. In addition, the display driving circuit 200 selects whether to perform a touch coordinate calculation function. Coordinates are not detected in the body recognition mode.

The display driving circuit 200 allows the body part or object detection information detected by the at least one human body detection sensor OPD and the biometric information detected by the plurality of fingerprint detection sensors HS to be displayed as an image in the display area DA of the display module DU (ST8).

Figure 16:
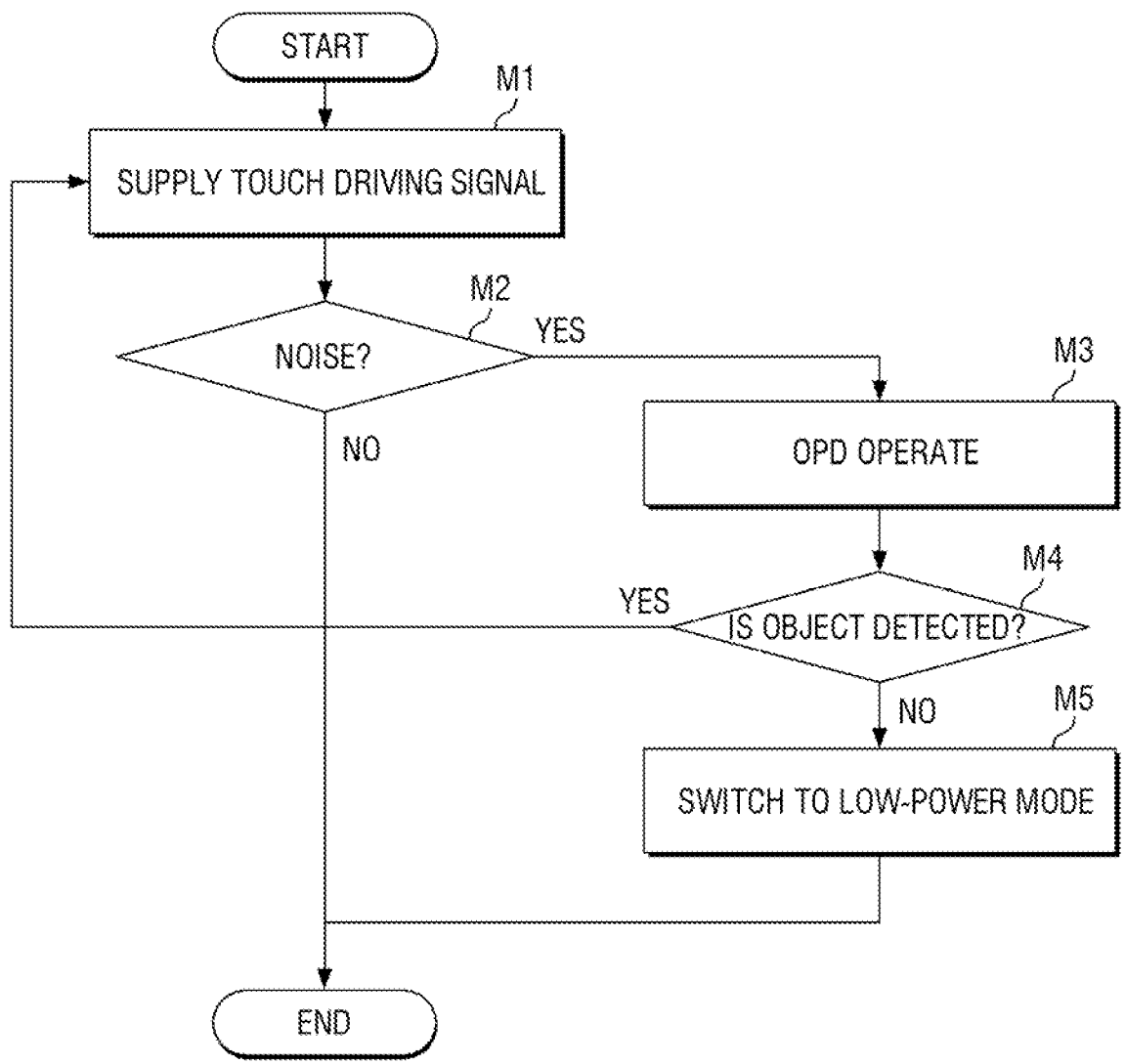
FIG. 16 is a flowchart of a process of changing a low-power mode of a touch driving circuit according to an embodiment.

FIG. 16 is a flowchart of a process of changing a low-power mode of a touch driving circuit according to an embodiment.

Referring to FIG. 16, in an embodiment, the touch driving control part 450 sequentially supplies the touch driving control signals for each group of the driving electrodes TE to the driving signal output part 410. Accordingly, the driving signal output part 410 sequentially supplies the touch driving signals to all the driving electrodes TE for each of the predetermined number of groups (M1).

The mode setting part 465 receives the noise level detection signal from the display driving circuit 200 and checks the noise level of the display module DU and the touch sensing unit TSU (M2).

During normal driving in which the noise level detection signal is not received, the mode setting part 465 supplies a normal mode control signal to the touch driving control part 450 so that the touch driving control part 450 is driven in the normal mode, thereby enabling the touch detection (M3). Accordingly, the data compensation part 480 calculates position coordinates CT_Data for touch data having a large difference data value.

On the other hand, when a touch input is detected in a noisy state, the mode setting part 465 receives a human body detection signal OS from at least one human body detection sensor OPD and the display driving circuit 200 and checks whether a body part or an object has been detected (M3 and M4).

When the human body detection signal OS is received, the mode setting part 465 determines that a body part or an object is disposed near a front surface of the display area DA, and supplies a normal mode driving signal to the touch driving control part 450 such that the touch driving control part 450 is driven in the normal mode. However, when the human body detection signal OS is not received, the mode setting part 465 determines that a touch detection has not been made, and transmits a low-power mode control signal to the touch driving control part 450 such that the touch driving control part 450 is driven in the low-power mode (M5).

When in a state in which it is determined that a touch has not been detected, no touch is detected for a predetermined period of time, and the mode setting part 465 transmits a sleep mode control signal to the touch driving control part 450 such that the touch driving control part 450 is driven in a sleep mode.

Figure 17:
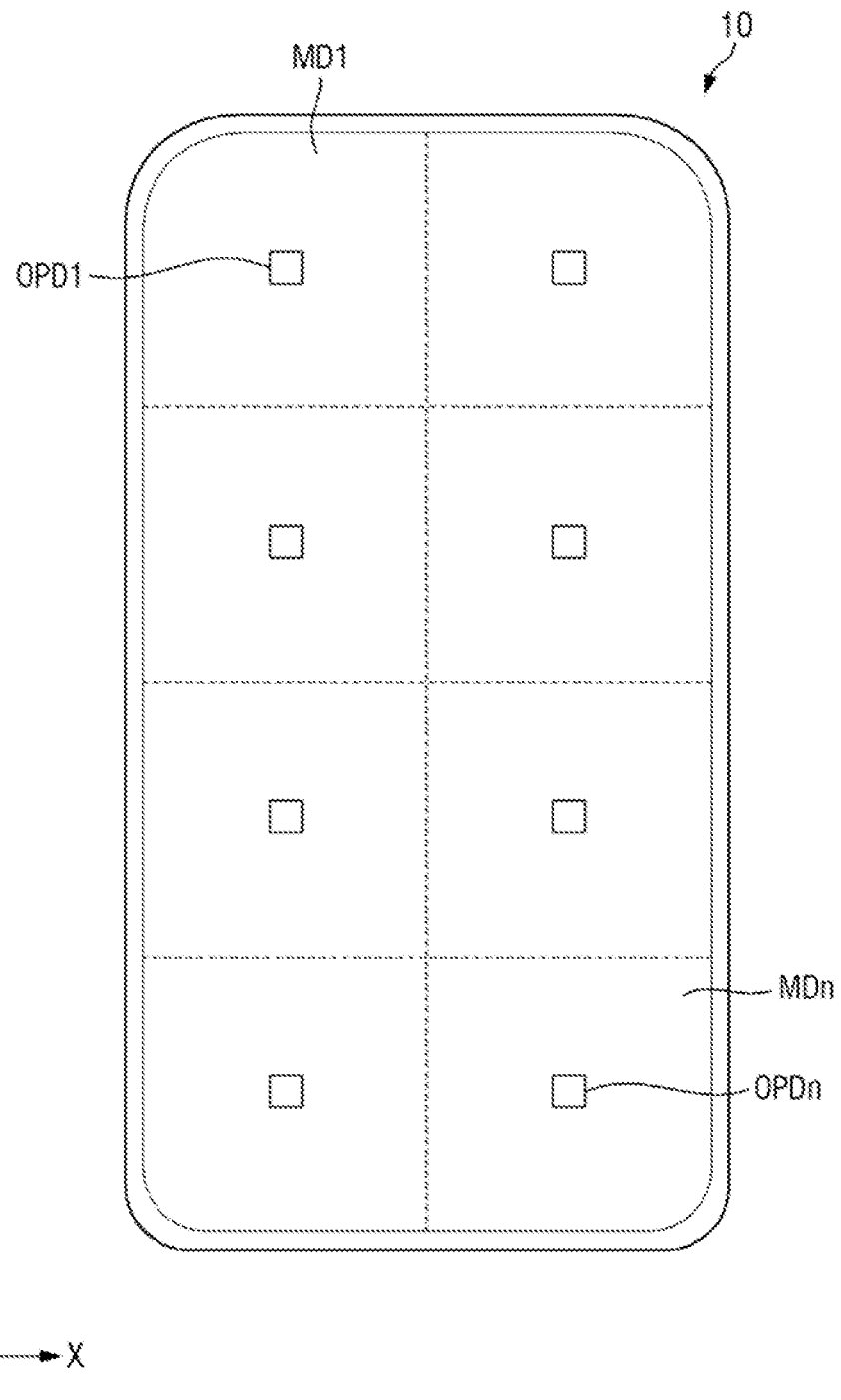
FIG. 17 illustrates divided areas of a display panel according to an arrangement of human body detection sensors.
Figure 18:
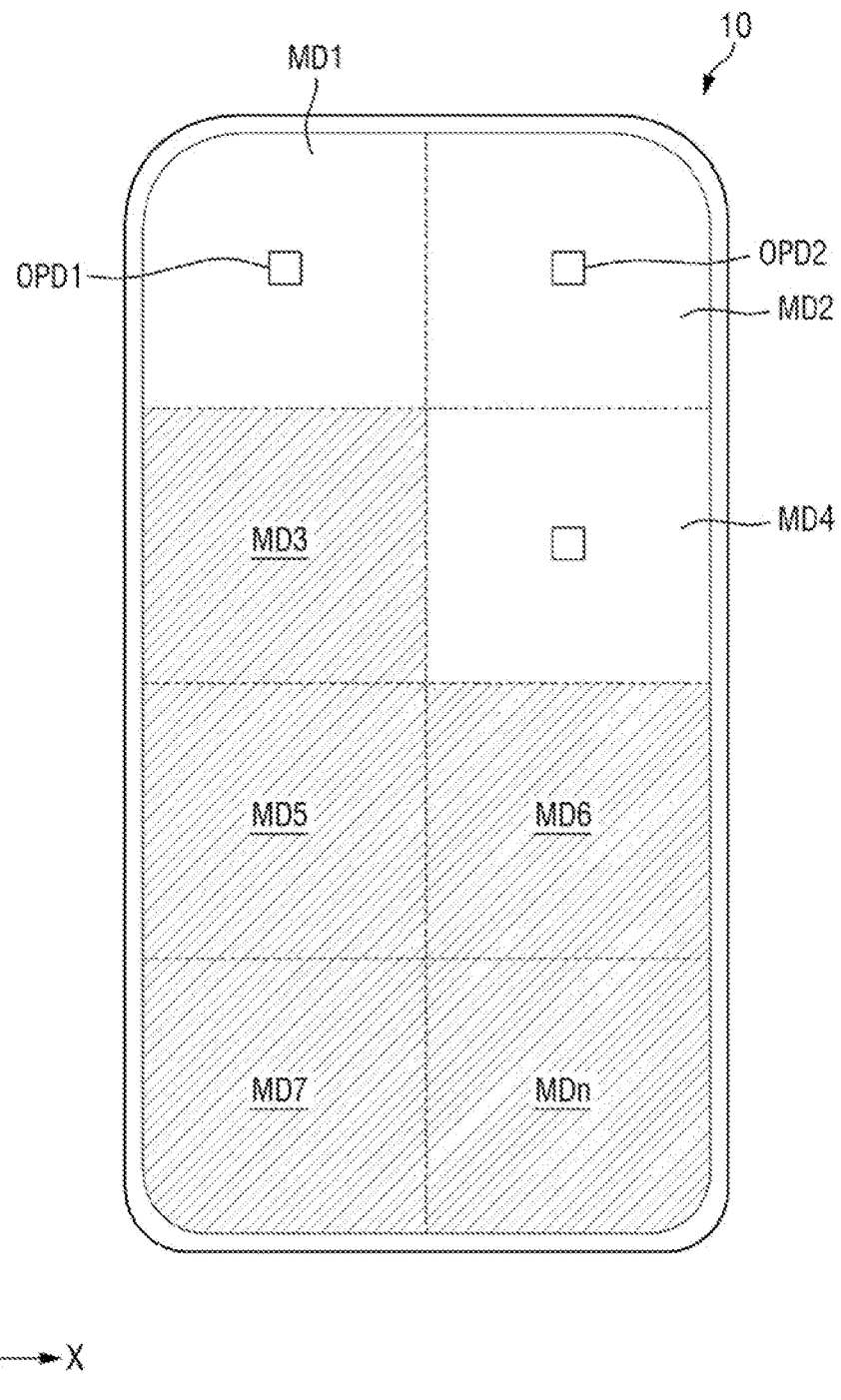
FIG. 18 illustrates a method of changing a touch sensing area of a touch driving circuit according to an embodiment.

FIG. 17 illustrates divided areas of the display panel according to the arrangement of human body detection sensors. FIG. 18 illustrates a method of changing a touch sensing area of a touch driving circuit according to an embodiment.

Referring to FIGS. 17 and 18, in an embodiment, the mode setting part 465 divides the image display area DA into a plurality of division regions MD1 to MDn according to the arrangement of the respective human body detection sensors OPD. In addition, the mode setting part 465 receives the human body detection signals OS from each of the human body detection sensors OPD and the display driving circuit 200 and changes and sets the touch sensing area to the arrangement areas MD1, MD2, and MD4 where the human body detection sensors OPD that transmitted the human body detection signals OS are disposed. The mode setting part 465 supplies the setting information of the changed touch sensing area to the touch driving control part 450, and controls the touch driving control part 450 such that the driving signal output part 410 supplies the touch driving signals only to the driving electrodes TE included in the touch sensing area.

Figure 19:
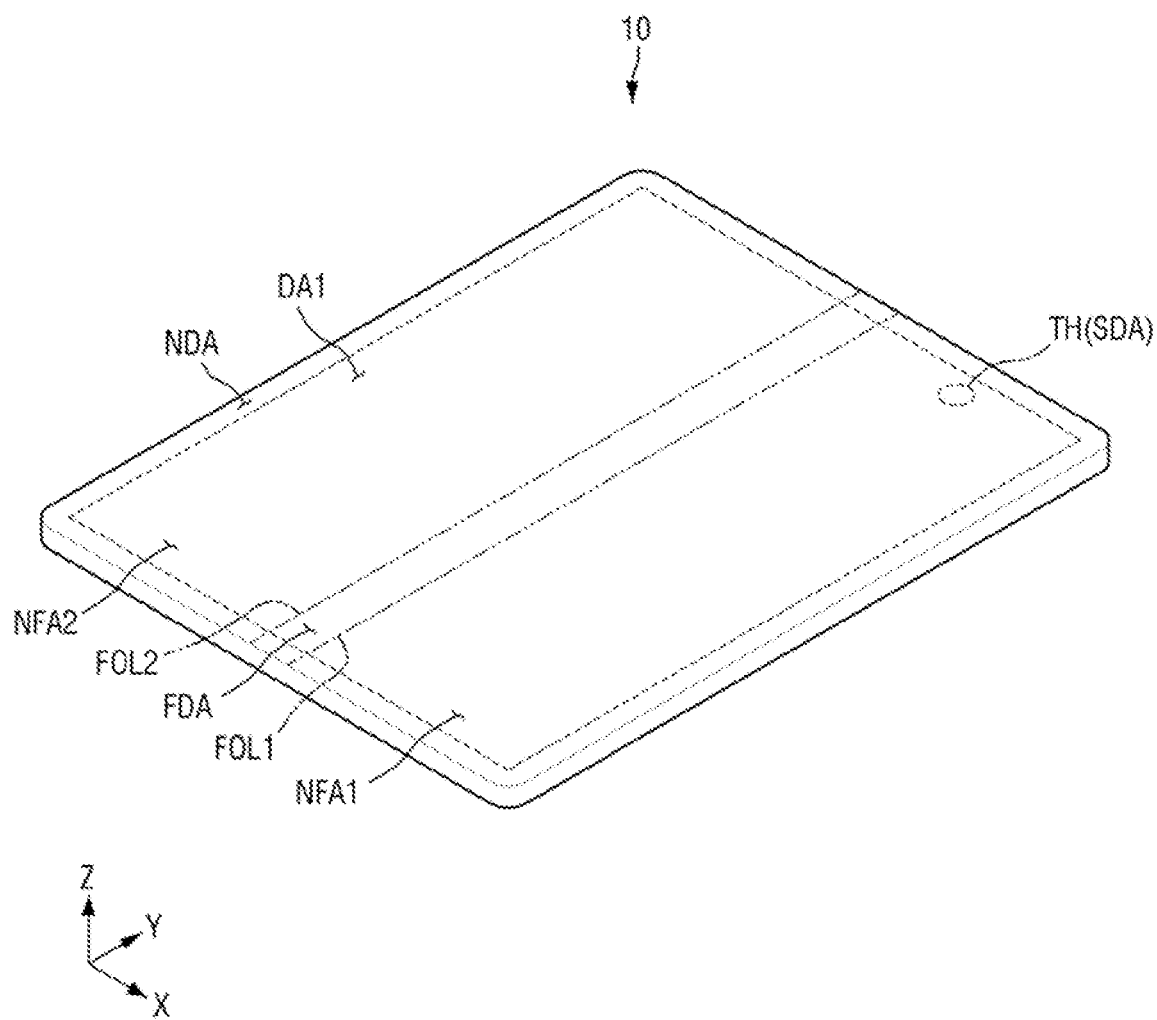
FIGS. 19 and 20 are perspective views of a display device according to an embodiment of the present disclosure.
Figure 20:
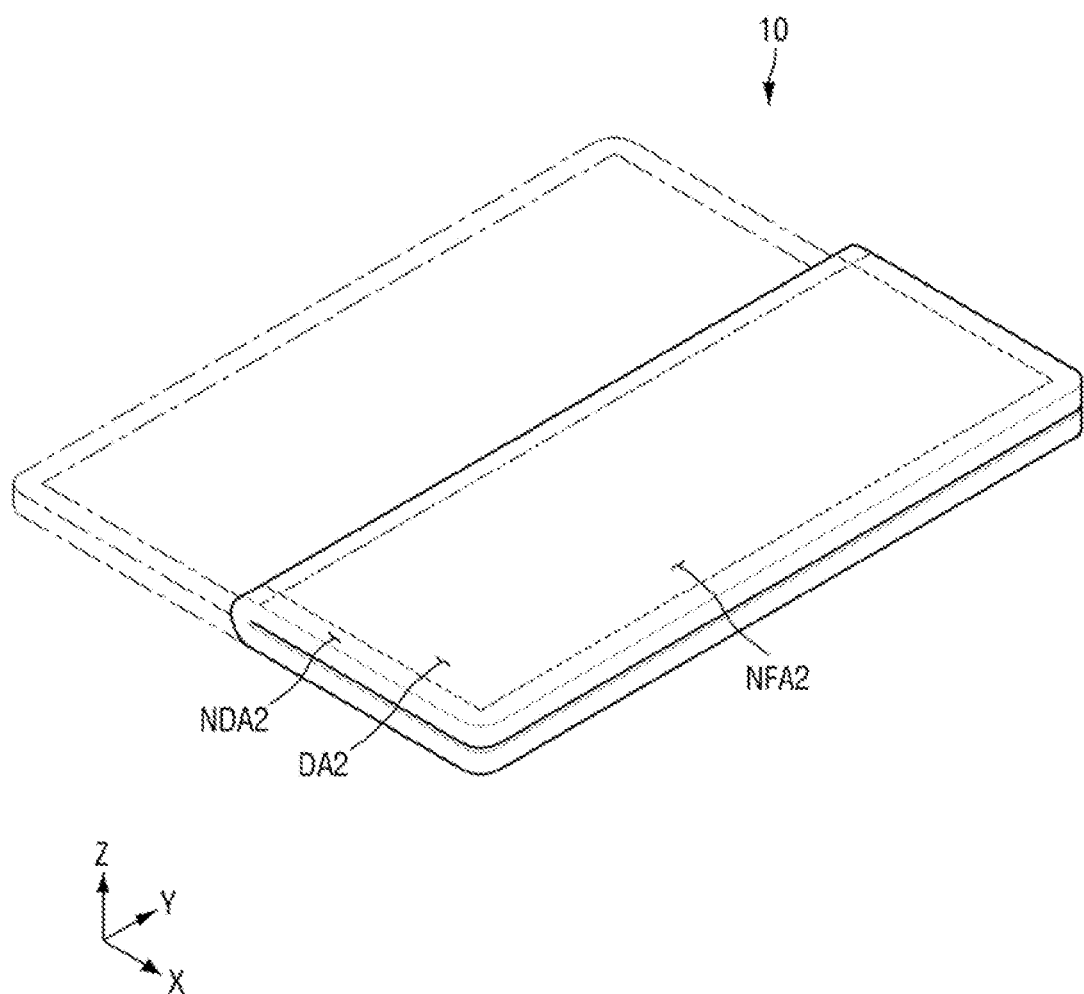

FIGS. 19 and 20 are perspective views of a display device according to an embodiment of the present disclosure.

According to an embodiment, FIGS. 19 and 20 illustrate a foldable display device 10 that is folded in the first (X) direction. The display device 10 can maintain both a folded state and an unfolded state. The display device 10 may be in-folded so that the front surface is disposed inside. When the display device 10 is bent or folded in an in-folded manner, parts of the front surface of the display device 10 face each other. Alternatively, the display device 10 may be out-folded so that its front surface is disposed outside. When the display device 10 is bent or folded in an out-folded manner, parts of a rear surface of the display device 10 may face each other.

A first non-folding area NFA1 is disposed on a side, such as a right side, of a folding area FDA. A second non-folding area NFA2 is disposed on the other side, such as a left side, of the folding area FDA.

The touch sensing units TSU according to an embodiment of the present disclosure is disposed on the first non-foldable area NFA1 and the second non-foldable area NFA2.

The foldable area FDA can be bent with a predetermined curvature along a first folding line FOL1 and a second folding line FOL2. Therefore, the first folding line FOL1 is a boundary between the foldable area FDA and the first non-foldable area NFA1, and the second folding line FOL2 is a boundary between the foldable area FDA and the second non-foldable area NFA2.

The first folding line FOL1 and the second folding line FOL2 extend in the second (Y) direction, and the display device 10 can be folded in the first (X) direction with respect to the first folding line FOL1 and the second folding line FOL2. Therefore, a length of the display device 10 in the first (X) direction is reduced to approximately half, which may make it more convenient for a user to carry the display device 10.

The extension directions of the first folding line FOL1 and the second folding line FOL2 are not limited to the second (Y) direction. For example, in an embodiment shown in FIGS. 21 to 22, the first folding line FOL1 and the second folding line FOL2 extend in the first (X) direction, and the display device 10 can be folded in the second (Y) direction. For example, a length of the display device 10 in the second (Y) direction is reduced to approximately half. Alternatively, in an embodiment, the first folding line FOL1 and the second folding line FOL2 extend in a diagonal direction of the display device 10 between the first (X) direction and the second (Y) direction. For example, the display device 10 can be folded in a triangular shape.

When the first folding line FOL1 and the second folding line FOL2 extend in the second (Y) direction, a length of the foldable area FDA is less in the first (X) direction than in the second (Y) direction. In addition, a length of the first non-foldable area NFA1 in the first (X) direction is greater than the length of the foldable area FDA in the first (X) direction. A length of the second non-foldable area NFA2 in the first (X) direction is greater than the length of the foldable area FDA in the first (X) direction.

A first display area DA1 is disposed on the front surface of the display device 10. The first display area DA1 overlaps the foldable area FDA, the first non-foldable area NFA1, and the second non-foldable area NFA2. Therefore, when the display device 10 is unfolded, an image can be displayed in a forward direction on the foldable area FDA, the first non-foldable area NFA1, and the second non-foldable area NFA2 of the display device 10.

A second display area DA2 is disposed on the rear surface of the display device 10. The second display area DA2 overlaps the second non-foldable area NFA2. Therefore, when the display device 10 is folded, an image can be displayed in the forward direction on the second non-foldable area NFA2 of the display device 10.

FIG. 19 shows a through hole TH formed in the first non-foldable area NFA1 and in which a camera SDA, etc., can be disposed, however, embodiments of the present disclosure are not necessarily limited thereto. In some embodiments, the through hole TH or the camera SDA is disposed in the second non-foldable area NFA2 or the foldable area FDA.

Figure 21:
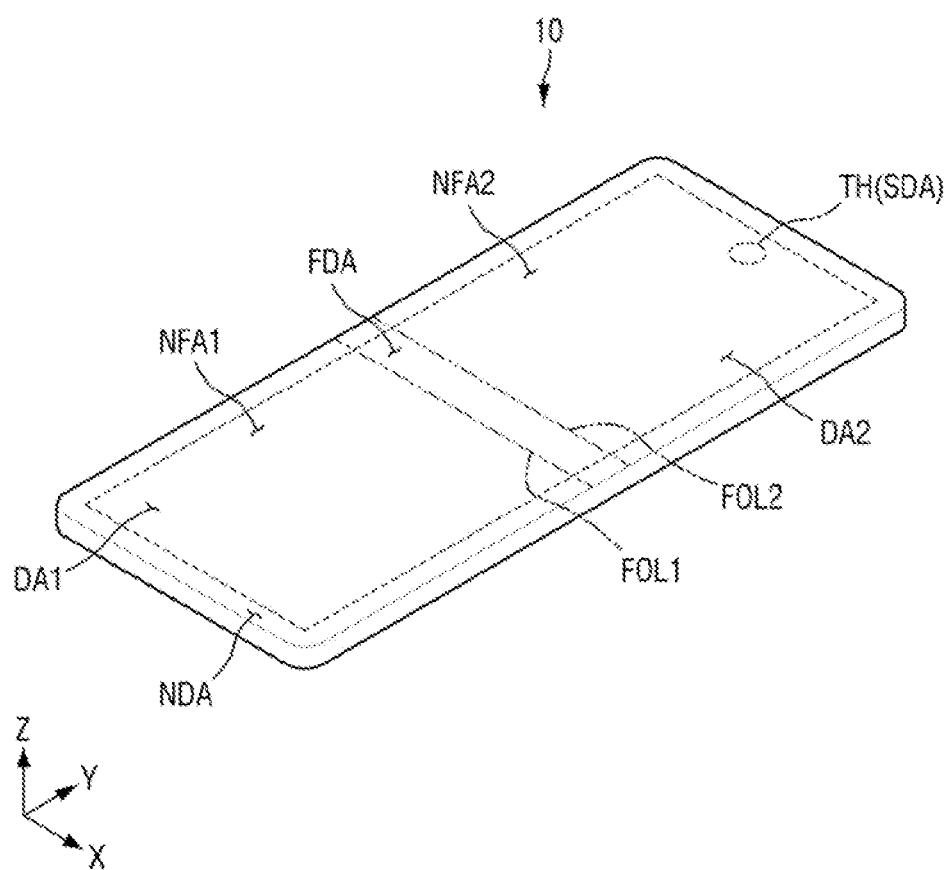
FIGS. 21 and 22 are perspective views of a display device according to an embodiment of the present disclosure.
Figure 22:
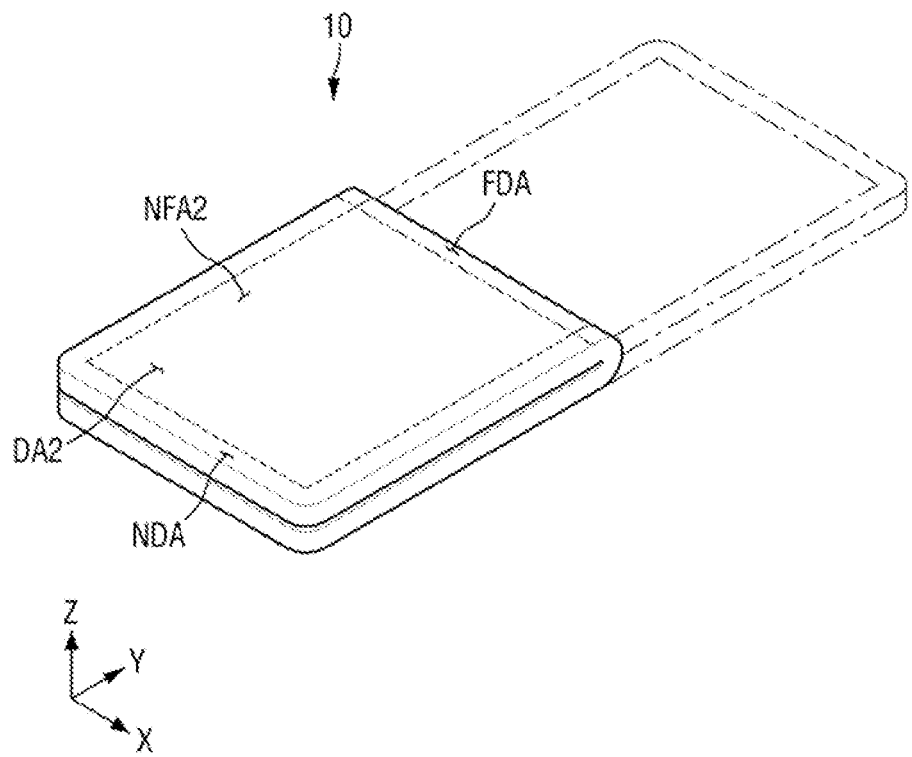

FIGS. 21 and 22 are perspective views of a display device according to an embodiment of the present disclosure.

According to an embodiment, FIGS. 21 and 22 illustrate a foldable display device 10 that is folded in the second (y) direction. The display device 10 can maintain both a folded state and an unfolded state. The display device 10 may be in-folded so that the front surface is disposed inside. When the display device 10 is bent or folded in an in-folded manner, parts of the front surface of the display device 10 face each other. Alternatively, the display device 10 can be out-folded so that its front surface is disposed outside. When the display device 10 is bent or folded in an out-folded manner, parts of a rear surface of the display device 10 may face each other.

The display device 10 includes a foldable area FDA, a first non-foldable area NFA1, and a second non-foldable area NFA2. The foldable area FDA is where the display device 10 is folded, and the first non-foldable area NFA1 and the second non-foldable area NFA2 are not folded. The first non-foldable area NFA1 is disposed on a side, such as a lower side, of the foldable area FDA. The second non-foldable area NFA2 is disposed on the other side, such as an upper side, of the foldable area FDA.

The touch sensing units TSU according to an embodiment of the present disclosure is formed and disposed on the first non-foldable area NFA1 and the second non-foldable area NFA2, respectively.

The foldable area FDA can be bent with a predetermined curvature along a first folding line FOL1 and a second folding line FOL2. Therefore, the first folding line FOL1 is a boundary between the foldable area FDA and the first non-foldable area NFA1, and the second folding line FOL2 is a boundary between the foldable area FDA and the second non-foldable area NFA2.

The first folding line FOL1 and the second folding line FOL2 extend in the first (X) direction as shown in FIGS. 21 and 22, and the display device 10 can be folded in the second (Y) direction with respect to the first folding line FOL1 and the second folding line FOL2. Therefore, a length of the display device 10 in the second (Y) direction is reduced to approximately half, which may make it more convenient for a user to carry the display device 10.

The extension directions of the first folding line FOL1 and the second folding line FOL2 are not limited to the first (X) direction. For example, in an embodiment shown in FIGS. 19-20, the first folding line FOL1 and the second folding line FOL2 extend in the second (Y) direction, and the display device 10 can be folded in the first (X) direction. For example, a length of the display device 10 in the first (X) direction is reduced to approximately half. Alternatively, in an embodiment, the first folding line FOL1 and the second folding line FOL2 extend in a diagonal direction of the display device 10 between the first (X) direction and the second (Y) direction. For example, the display device 10 can be folded in a triangular shape.

When the first folding line FOL1 and the second folding line FOL2 extend in the first (X) direction as shown in FIGS. 21 and 22, a length of the foldable area FDA is less in the second (Y) direction than in the first (X) direction. In addition, a length of the first non-foldable area NFA1 in the second (Y) direction is greater than the length of the foldable area FDA in the second (Y) direction. A length of the second non-foldable area NFA2 in the second (Y) direction is greater than the length of the foldable area FDA in the second (Y) direction.

A first display area DA1 is disposed on the front surface of the display device 10. The first display area DA1 overlaps the foldable area FDA, the first non-foldable area NFA1, and the second non-foldable area NFA2. Therefore, when the display device 10 is unfolded, an image can be displayed in a forward direction on the foldable area FDA, the first non-foldable area NFA1, and the second non-foldable area NFA2 of the display device 10.

A second display area DA2 is disposed on the rear surface of the display device 10. The second display area DA2 overlaps the second non-foldable area NFA2. Therefore, when the display device 10 is folded, an image can be displayed in the forward direction on the second non-foldable area NFA2 of the display device 10.

FIG. 21 shows a through hole TH disposed in the second non-foldable area NFA2 in which a camera SDA, etc., can be disposed, however, embodiments of the present disclosure are not necessarily limited thereto. In an embodiment, the through hole TH is disposed in the first non-foldable area NFA1 or the foldable area FDA.

In concluding the detailed description, those skilled in the art will appreciate that many variations and modifications can be made to embodiments without substantially departing from the principles of embodiments of the present disclosure. Therefore, embodiments of the disclosure are used in a generic and descriptive sense only and not for purposes of limitation.

What is claimed:

1. A touch detection module, comprising:
   a plurality of driving electrodes that extend in parallel;
   a plurality of sensing electrodes that intersect the plurality of driving electrodes; and
   a touch driving circuit that supplies touch driving signals to the plurality of driving electrodes and detects touch position coordinates by detecting touch sensing signals from the plurality of sensing electrodes,
   wherein the touch driving circuit changes a driving mode according to one of a noise level, an object detection result, or a touch position detection result,
   wherein the touch driving circuit includes a touch driving control part that sets at least one of the plurality of driving electrodes as a detection reference line and supplies the touch driving signals to the plurality of driving electrodes, and
   a mode setting part that changes the driving mode of the touch driving control part according to at least one of a noise level detection signal or a result of detection of touch position coordinates,
   wherein the mode setting part:
   changes the touch driving control part to a biometric information detection mode in response to the noise level detection signal,
   when the noise level detection signal is lower than a predetermined reference level, supplies a first mode detection signal to a display driving circuit of a display panel and the touch driving control part such that biometric information and an object are detected, and
   when the noise level detection signal is higher than the predetermined reference level, supplies a second mode detection signal to the display driving circuit and the touch driving control part such that the biometric information and the object are detected.

2. The touch detection module of claim 1, wherein the touch driving circuit further comprises:
   a driving signal output part that supplies the touch driving signals to the plurality of driving electrodes under control of the touch driving control part; and
   a sensing circuit part that detects the touch sensing signals from the plurality of sensing electrodes.

3. The touch detection module of claim 2, further comprising:
   an analog-to-digital converter that sequentially converts the touch sensing signals into touch data and converts a detection reference signal detected by the detection reference line into detection reference data;
   a signal deviation detection part that compares the touch data with the reference data and extracts difference data values in accordance with comparison results;
   a compensation data storage that outputs compensation data that corresponds to the difference data values; and
   a data compensation part that corrects the touch data by performing an addition or subtraction operation on the touch data and the compensation data and calculates position coordinates for the touch data in accordance with the difference data values.

4. The touch detection module of claim 3, wherein the touch driving control part
   divides the plurality of driving electrodes into groups in units of a predetermined number of driving electrodes and supplies touch driving control signals for each group to the driving signal output part, and
   supplies a touch driving control signal to the driving signal output part such that the touch driving signal is supplied to the detection reference line.

5. The touch detection module of claim 3, wherein the touch driving control part
   divides the plurality of driving electrodes into groups in units of a predetermined number of driving electrodes and supplies touch driving control signals for each group to the driving signal output part,
   supplies a touch driving control signal and touch driving control signals for other adjacent groups to the driving signal output part, and
   supplies touch driving control signals for a group to which the detection reference line belongs to the driving signal output part such that the touch driving control signal for the detection reference line is repeatedly supplied.

6. The touch detection module of claim 3, wherein
   the mode setting part receives a human body detection signal from at least one human body detection sensor in response to the noise level detection signal, checks whether a body part or an object has been detected, and transmits a rejection signal to the signal deviation detection part according to whether the body part or the object has been detected and
   the signal deviation detection part extracts the difference data values by using some of the touch sensing signals or the touch data as valid data in units of a predetermined number of frames in response to the rejection signal, and rejecting remaining touch sensing signals or the touch data.

7. The touch detection module of claim 6, wherein the data compensation part
   compares position coordinates detected in a normal mode, in which the noise level detection signal is not received, with position coordinates detected when the noise level detection signal is received and,
   when the position coordinate comparison result is maintained with a predetermined error range, provides to an external display driving circuit intermediate coordinates that are between the compared position coordinates.

8. The touch detection module of claim 3, wherein the mode setting part
   receives a human body detection signal from at least one human body detection sensor in response to the noise level detection signal and checks whether a body part or an object has been detected, and
   transmits a low-power mode control signal to the touch driving control part such that the touch driving control part is driven in a low-power mode, according to whether the body part or the object has been detected.

9. The touch detection module of claim 8, wherein the mode setting part transmits a sleep mode control signal to the touch driving control part such that the touch driving control part is driven in a sleep mode, when no touch has been detected for a predetermined period of time in a state in which the low-power mode control signal has been transmitted.

10. The touch detection module of claim 3, wherein the mode setting part divides an image display area of a display panel in which a plurality of human body detection sensors are disposed into a plurality of division regions according to an arrangement of the plurality of human body detection sensors, changes a touch sensing area to arrangement areas of human body detection sensors of the plurality of human body detection sensors that transmit a human detection signal, and controls the touch driving control part wherein the touch driving control part supplies the touch driving signals only to the driving electrodes included in the changed touch sensing area.

11. The touch detection module of claim 1, wherein the touch driving control part detects the biometric information or the object by adjusting at least one of a detection time, a filtering strength, or a sensitivity for at least one human body detection sensor to differ from other one human body detection sensors in response to the first or second mode detection signal.

12. A display device, comprising:

a display panel that includes a display area in which a plurality of pixels are disposed; and a touch detection module disposed on a front surface of the display panel and that detects a user's touch, wherein the touch detection module comprises:
a plurality of driving electrodes that extend in parallel;
a plurality of sensing electrodes that intersect the plurality of driving electrodes; and
a touch driving circuit that supplies touch driving signals to the plurality of driving electrodes and detects touch position coordinates by detecting touch sensing signals through the plurality of sensing electrodes, wherein the touch driving circuit changes a driving mode according to at least one of a noise level received from a display driving circuit, an object detection result, or a touch position detection result, wherein the touch driving circuit includes a touch driving control part that sets at least one of the plurality of driving electrodes as a detection reference line and supplies the touch driving signals to the plurality of driving electrodes, and a mode setting part that changes the driving mode of the touch driving control part according to a noise level detection signal received from the display driving circuit and a result of detection of touch position coordinates, wherein the mode setting part receives a human body detection signal from at least one human body detection sensor in response to the noise level detection signal and checks whether a body part or an object has been detected, and transmits a low-power mode control signal to the touch driving control part such that the touch driving control part is driven in a low-power mode, according to whether the body part or the object has been detected.

13. The display device of claim 12, wherein the touch driving circuit comprises:

a driving signal output part that supplies the touch driving signals to the plurality of driving electrodes under control of the touch driving control part; and a sensing circuit part that detects the touch sensing signals through the plurality of sensing electrodes.

14. The display device of claim 13, further comprising:

an analog-to-digital converter that sequentially converts the touch sensing signals into touch data and converts a detection reference signal detected by the detection reference line into detection reference data;

a signal deviation detection part that compares the touch data with the reference data and extracts difference data values in accordance with comparison results;

a compensation data storage that outputs compensation data that corresponds to the difference data values; and a data compensation part that corrects the touch data by performing an addition or subtraction operation on the touch data and the compensation data and calculates position coordinates for the touch data in accordance with the difference data values.

15. The display device of claim 14, wherein the touch driving control part divides the plurality of driving electrodes into groups in units of a predetermined number of driving electrodes and supplies touch driving control signals for each group to the driving signal output part, and supplies a touch driving control signal to the driving signal output part such that the touch driving signal is supplied to the detection reference line.

16. The display device of claim 14, wherein the mode setting part receives a human body detection signal through at least one human body detection sensor in response to the noise level detection signal received from the display driving circuit, checks whether a body part or an object has been detected, and transmits a rejection signal to the signal deviation detection part according to whether the body part or the object has been detected and the signal deviation detection part extracts the difference data values by rejecting the touch sensing signals or the touch data in units of a predetermined number of frames in response to the rejection signal.

17. The display device of claim 14, wherein the mode setting part changes the touch driving control part to a biometric information detection mode in response to the noise level detection signal, when the noise level detection signal is lower than a predetermined reference level, supplies a first mode detection signal to the display driving circuit of the display panel and the touch driving control part such that biometric information and an object are detected, and when the noise level detection signal is higher than the predetermined reference level, supplies a second mode detection signal to the display driving circuit and the touch driving control part such that the biometric information and the object are detected.

18. The display device of claim 14, wherein the mode setting part divides an image display area of a display panel in which a plurality of human body detection sensors are disposed into a plurality of division regions according to arrangement areas of the plurality of human body detection sensors, changes a touch sensing area to arrangement areas of human body detection sensors of the plurality of human body detection sensors that transmit a human detection signal, and controls the touch driving control part wherein the touch driving control part supplies the touch driving signals only to the driving electrodes included in the changed touch sensing area.

19. The display device of claim 12, wherein the mode setting part transmits a sleep mode control signal to the touch driving control part such that the touch driving control part is driven in a sleep mode, when no touch has been detected for a predetermined period of time in a state in which the low-power mode control signal has been transmitted.

20. An electronic device, comprising:
- a touch driving circuit that supplies touch driving signals to a plurality of driving electrodes and detects touch position coordinates by detecting touch sensing signals from a plurality of sensing electrodes, wherein the touch driving circuit comprises:
- a driving signal output part that supplies the touch driving signals to the plurality of driving electrodes;
- a sensing circuit part that detects the touch sensing signals from the plurality of sensing electrodes;
- a touch driving control part that sets at least one of the plurality of driving electrodes as a detection reference line and controls driving of the driving signal output part and supplies the touch driving signals to the plurality of driving electrodes;
- a mode setting part that changes a driving mode of the touch driving control part according to at least one of a noise level detection signal or a result of detection of touch position coordinates;
- an analog-to-digital converter that sequentially converts the touch sensing signals into touch data and converts a detection reference signal detected by the detection reference line into detection reference data;
- a signal deviation detection part that compares the touch data with the reference data and extracts difference data values in accordance with comparison results;
- a compensation data storage that outputs compensation data that corresponds to the difference data values; and
- a data compensation part that corrects the touch data by performing an addition or subtraction operation on the touch data and the compensation data and calculates position coordinates for the touch data in accordance with the difference data values, wherein the mode setting part divides an image display area of a display panel in which a plurality of human body detection sensors are disposed into a plurality of division regions according to arrangement areas of the plurality of human body detection sensors, changes a touch sensing area to arrangement areas of human body detection sensors of the plurality of human body detection sensors that transmit a human detection signal, and controls the touch driving control part wherein the touch driving control part supplies the touch driving signals only to the driving electrodes included in the changed touch sensing area.

* * * * *